United States Patent
Noufal et al.

(10) Patent No.: US 12,352,151 B2
(45) Date of Patent: Jul. 8, 2025

(54) ARTIFICIAL INTELLIGENCE TOOL FOR GEOSTRESS AND GEOSTRAIN ANALYSIS

(71) Applicant: MATRIX JVCO LTD, Abu Dhabi (AE)

(72) Inventors: Abdelwahab Noufal, Abu Dhabi (AE); Rachid Belmeskine, Abu Dhabi (AE); Mohamed Amri, Abu Dhabi (AE); Abed Benaichouche, Abu Dhabi (AE)

(73) Assignee: MATRIX JVCO LTD, Abu Dhabi (AE)

( * ) Notice: Subject to any disclaimer, the term of this patent is extended or adjusted under 35 U.S.C. 154(b) by 0 days.

(21) Appl. No.: 18/044,117

(22) PCT Filed: Sep. 8, 2021

(86) PCT No.: PCT/IB2021/058161
§ 371 (c)(1),
(2) Date: Mar. 6, 2023

(87) PCT Pub. No.: WO2022/053945
PCT Pub. Date: Mar. 17, 2022

(65) Prior Publication Data
US 2024/0352845 A1    Oct. 24, 2024

Related U.S. Application Data

(60) Provisional application No. 63/075,343, filed on Sep. 8, 2020.

(51) Int. Cl.
E21B 47/002    (2012.01)
G06T 11/20    (2006.01)

(52) U.S. Cl.
CPC .......... *E21B 47/002* (2020.05); *G06T 11/206* (2013.01)

(58) Field of Classification Search
CPC ........ E21B 49/00; E21B 47/002; E21B 41/00; E21B 47/0025
See application file for complete search history.

(56) References Cited

U.S. PATENT DOCUMENTS

2012/0173216 A1* 7/2012 Koepsell ................. E21B 49/00
                                                                    703/6
2014/0067269 A1    3/2014 Maerten et al.
(Continued)

OTHER PUBLICATIONS

International Search Report and Written Opinion of the International Searching Authority for corresponding International Patent Application No. PCT/IB2021/058161, dated Jan. 28, 2022.
(Continued)

*Primary Examiner* — Zakiya W Bates
(74) *Attorney, Agent, or Firm* — Renner, Otto, Boisselle & Sklar, LLP

(57) ABSTRACT

Computer-implemented system and method for conducting borehole image interpretation, by analyzing data relative to geological features planes orientations and the associated striae data, automatically checking the data consistency, visualizing the data in specify graphical components, performing geometrical data classification, performing stress and strain analysis to assess principal axes orientations and stress ratios, and visualizing the results in specific graphical components, including the application of inversion algorithms to calculate principal stress orientations by using specific graphical components to visualize input data and results.

19 Claims, 17 Drawing Sheets

(56) References Cited

U.S. PATENT DOCUMENTS

| | | |
|---|---|---|
| 2017/0205531 A1 | 7/2017 | Berard et al. |
| 2018/0172857 A1 | 6/2018 | Lejri et al. |
| 2019/0243017 A1 | 8/2019 | Klinger |
| 2020/0095858 A1 | 3/2020 | Bouaouaja et al. |
| 2020/0225382 A1 | 7/2020 | Mallet et al. |

OTHER PUBLICATIONS

Calvin et al. y-gRaph: An OpenOffice application to reconstruct paleostress fields from striated faults. Computers & Geosciences. Mar. 4, 2014, vol. 67, pp. 24-30.

Extended European Search Report dated Oct. 25, 2024, for European Application No. 21866175.9.

Pablo Calvin et al.; y-gRaph: An OpenOffice application to reconstruct paleostress fields from striated faults; Computers & Geosciences; Feb. 19, 2014; pp. 24-30; vol. 67.

* cited by examiner

ARTIFICIAL INTELLIGENCE TOOL FOR GEOSTRESS AND GEOSTRAIN ANALYSIS

CROSS REFERENCE TO RELATED APPLICATION

This application is a national phase of International Application No. PCT/IB2021/058161 filed Sep. 8, 2021, which claims priority from U.S. Provisional Patent Application No. 63/075,343, filed Sep. 8, 2020, the entire disclosure disclosures of which are incorporated herein by reference for all purposes.

BACKGROUND

Field of Invention

The invention relates to a computer-implemented system for conducting borehole image interpretation, by analyzing data relative to geological features planes orientations and the associated striae data, automatically checking the data consistency, visualizing the data in specify graphical components, performing geometrical data classification, perform stress and strain analysis to assess principal axes orientations and stress ration, and visualize the results in specific graphical components, and particularly the application of inversion algorithms to calculate principal stress orientations by using specific graphical components to visualize input data and results.

Description of Prior Art

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

According to the two-dimensional Mohr-Coulomb theory (Jaeger and Cook, 1979), fault slip occurs when shear stress t across a fault plane equals the frictional resistance to slip:

$$\tau = \tau_0 + \mu(\sigma_n - P)$$

where $\tau_0$ is the cohesive shear strength of the fault, $\mu$ is the friction coefficient, on the normal stress across the fault, and P is the fluid pressure in the fault zone and its surroundings. In unfaulted material, the two conjugate planes on which failure and slippage occur at the lowest differential stress ($\sigma_1 - \sigma_3$) are perpendicular to the plane containing the greatest and least principal stresses ($\sigma_1$ and $\sigma_3$ respectively); they intersect in the intermediate principal stress ($\sigma_2$), and are inclined at angles of $\pm\theta_0$ to $\sigma_1$, where:

$$\theta_0 = 45° - 1/2 \tan - 1\ \mu$$

Laboratory-derived values of internal rock friction yield $\mu = 0.6 - 0.9$ (Byerlee, 1978), and imply that $\theta_0 = 25°-30°$.

Seismological determinations of earthquake slip directions (fault-plane solutions) resolve two possible orthogonal fault planes, but in the absence of supplementary data the actual plane of slippage cannot be distinguished (Thatcher and Hill, 1991). In studies in which fault-plane solutions are used to infer principal stress orientations, it is usually assumed that the σ1 direction bisects the angle between the two orthogonal fault planes, even though it is recognized that seismic data can determine only the principal axes of the seismic moment tensor (Aki and Richards, 1980). This is equivalent to assuming that slippage occurs on planes of maximum shear stress, and for usual values of rock friction these planes differ by 15° to 20° in orientation from the optimum Mohr-Coulomb failure planes.

In the absence of fault planes of optimum orientation $\theta_0$, slippage can occur at higher stresses or higher ambient fluid pressures on less optimally preexisting planes of weakness (Thatcher and Hill, 1991). Provided that such planes can be reactivated lower than those required to create new fractures of optimum orientations, reactivation in a stage of compressive stress ($\sigma_3$-P-0) can occur on faults inclined by as much as $2\theta_0$ from the $\sigma_1$ direction (Sibson, 1985).

Structural and paleomagnetic evidence indicates that in many regions faults rotate away from the orientation of $\sigma_1$ as they slip (Freund, 1974; and Proffet, 1977), suggesting that faults beginning at $\pm\theta_0$ would rotate to progressively less optimal orientations as they evolve (Thatcher and Hill, 1991).

It is usually assumed that in the brittle crust one principal stress is vertical and the remaining two are horizontal, the vertical stress being given by the rock overburden pressure. For strike-slip faulting, the greatest and least principal stresses are horizontal and the intermediate stress is vertical.

The present methods of fracture analysis fall into two groups: kinematic and dynamic. In addition, in each general class, one can analyze the data by either numeric or graphical methods, and field relations contain the ultimate clues to, and the ultimate justification for, application of these methods (it is recommended to apply this methodology on the outcrops to calibrate our model).

The analysis of fracture data aims to determine the orientation of the three principal stress axes, which caused fracturing ($\sigma_1$, $\sigma_2$, and $\sigma_3$). Since Carey and Brunier (1974), numerous interactive linear and nonlinear algorithms to solve such problems have been described (Angelier, 1989; Angelier et al., 1982; Angelier, 1989; Michael, 1984; Etchecopar and Mattauer, 1988; Armijo and Cisternas, 1978; Armijo et al., 1982; and many others). All nonlinear procedures have been proposed under two important assumptions (Huang, 1989): 1-all striae directions coincide with maximum shear stress on fault planes; 2-fault planes are distributed randomly over the spherical space and are independent with respect to the orientation of the stress axes (Bott's hypothesis, 1959). For the linear model, a constraint is added to ensure that the magnitude of the shear stress on fault planes with different orientations is constant or unitary (Michael, 1984). On these assumptions, Carey and Brunier (1974) first proposed a procedure to compute stress axes and stress ratio (R). Since then, a number of similar procedures have been advanced and applied to fault tectonic analysis (e.g. Letouzy, 1986; and Bergerat, 1987). Since, the fractures are the first stage in the faulting process and the displacement is very small, we can consider the displacement of the fracture is depending on its mode and the accompanying faulting.

From the physical point of view, Huang (1989) reported some drawbacks to these methods: first, fault planes are not distributed randomly in three dimensions. Secondly, according to Bott's hypothesis, the striation is produced only on preexisting and randomly distributed fractures or planes of weakness. As stated by Mckenzie and Jackson (1983) no obvious relation exists between orientations of the stress axes and such reactivated faults. Moreover, Bott's hypothesis does not take possible propagation and deformation of preexisting fractures into account; thus this model is geometrical rather than mechanical. Finally, as all fault measurements are geometrical, with no amount such as magnitude of displacement associated with them, they are ellipsoidal, unless one assumes that all faults have the same displacement (unitary). However, with such directional data the orientation of the stress axes can be obtained reasonably.

Huang (1989) presented two mathematical models to calculate the orientation of stress axes related to a set of conjugate fault slip data generated under a single tectonic event, by using the statistics of orientation data and convolution process. However, in conjugate fault systems, the orientation of fault planes as well as slickensides are determined by the principal stress axes, because the same tectonic event induces both formation of faults and movement along them. As all the numerical procedures are valid only if the fault data set is generated under a single tectonic event, a preliminary distinction in the field is a good guide to the final and precise determination of chronology of faulting event; in addition, automatically defining fault subsets within the data set is indispensable to avoid the tremendous manual work (Huang, 1989). The theory of dynamic cluster analysis proposed by Diday (1971) is a suitable mathematical procedure to fulfill such a task.

Huang (1989) concluded that the faults with several tens of meter displacement will change the surrounding stress field. Obviously, if the methods of Huang (1989) for the stress tensor determination are used, fault measurements must be taken away from such large-scale faults. But shallow-level faults with small displacement generally are conjugate, and can be approximated as Coulomb fractures. Huang (1989) reported also that the behavior of reactivated faults is more difficult to understand. Can such reactivated faults be used to accurately determine the stress state? To that no affirmative answer exists. Therefore, as fault populations in the tested reservoirs commonly result from several events through the rift development, a preliminary distinction between successive events should be made in the field, on the basis of stratigraphic and structural observations.

Etchecopar et al., (1981) described an iterative method applicable to multiphase tectonics where the sorting of the data and the computation of the stress tensors are performed alternatively, and finally shown to successfully separate several superimposed tectonic phases.

A number of inversion methods utilize slickensided surfaces to more fully describe stress. The slickenlines are assumed to represent the direction of maximum resolved shear stress on the fault plane. The stress field, under which these slickenlines developed, is assumed to be uniform. No assumptions are made regarding the relationship between the fault plane and stress orientation, a requirement in regions where faults have occurred on preexisting surfaces. Such fault-slip inversion methods yield the stress tensor orientation and the relative magnitudes of the stress axes (tensor configuration, Hardcastle, 1989). However, the absolute magnitudes of the stress axes are not determined (Angelier, 1984, and 1989; Armijo et al., 1982; Etchecopar et al., 1981; Gephart and Forsyth, 1984; and Reches, 1987).

During inversion where calculations are based on resolved stress, it is important to determine if Mohr-Coulomb yield criteria have been satisfied, as these criteria can greatly affect the resolved normal ($\sigma_n$) and shear stresses ($\tau$) (Reches, 1987; and Ivins et al., 1987). Yield criteria include coefficient of friction $\mu$ and cohesion C on the fault surface. Fluid pressure $P_{fluid}$ is implied in on, where $\sigma_n = \sigma_n - P_{fluid}$. A value for $P_{fluid}$ is not considered computationally in any of the inversion methods. These criteria are related by the Mohr-Coulomb equation:

$$\tau \geq C + \mu \sigma_n \qquad \text{Equation 1}$$

As faults are reactivated discontinuities, C and $\mu$ pertain to the properties of the discontinuities, and not to the intact rock strength. There is increasing evidence and controversy over the value of "$\mu$" for natural fault zones (e.g., the San Andreas fault zone in California, Zoback, 1987). The values can apparently be very low relative to values typically derived in laboratory experiments (Byerlee, 1986).

Slip data from different wells in different reservoirs stations in soe fields of Abu Dhabi were selected for these analyses in order to obtain the stress tensors to distinguish the successive tectonic events and finally to put a tectonic model for the evolution of Abu Dhabi. The discontinuity of the data separated by dense zones probably introduces some bias into the sampling of measurements in terms of azimuthal frequencies.

These data include: dip azimuth and dip inclination of the fractures and faults, and the sense of dip of the hanging-wall block (in the faults cases). The resulting stress tensors were calculated from homogeneous fractures and fault populations (the separation of homogeneous from inhomogeneous data sets is elaborated below), after separation of the slip data collected from the studied reservoirs at each station into slip populations for each distinct reservoir unit encountered.

The sense of movement was deduced from kinematic indicators, e.g., offset markers, fibrous minerals grown behind the fault steps, riedel shears, tension gashes and slickolites (see Hancock, 1985; and Petit, 1987). Fault planes without known sense of movement were also considered. Size and surface morphology of fault planes with slickensides (i.e., fiber- or stylolite-coated, polished) from outcrops were recorded and compared to the subsurface data due each tectonic event. Features revealing the relative ages of two or more slickensides, overgrowth relation of differently oriented fibers, fibers with changing growth direction, mineralogy of fiber crystallization, and fault intersections (Hancock, 1985; and Angelier, 1989) were noted. Additional information about relative ages was inferred from the geometrical relationships of planes to the stress field in which they moved; this means that for example fault planes which exhibit striations defining subhorizontal extension now, most probably did not form during this event but rather as conjugate strike-slip faults during subhorizontal shortening. In some cases, subhorizontal lineation is preserved, and faults with lineations parallel or compatible with the older one can be separated as an older fault population.

To obtain the direction of the principal compressional axes $\sigma_1\_\sigma_2\_\sigma_3$, and the ratio $R=\sigma_2-\sigma_3/\sigma_1-\sigma_3$ of the stress tensors, a number of graphical and numerical methods were used namely, pressure/tension axes method, numerical dynamic analysis, right dihedra method, direct inversion method, and iterative grid search method. Since Anderson (1951), geologists have tried to interpret the dynamics of the populations of striated fault planes assuming a correspondence between the direction of the resolved shear stress on the fault plane and the slickenside striation.

The precise relationship between a slickenside striation and the tectonic stresses responsible for its genesis were established by Bott (1959). The orientation of a striation on a fault plane depends on four parameters, namely, the three distribution parameters (Euler angles), the "R" ratio, one differential stress ($\sigma_d = \sigma_2 - \sigma_3$) and the isotropic pressure ($P_i = \sigma_1 + \sigma_2 + \sigma_3/3$). The values of ratio "R" utilized by Etchecopar et al. (1981) vary between 0 and 1. This ratio has been differently expressed by Carey (1976); Armijo and Cisternas (1978); Vergely et al. (1987); and Guiraud et al. (1989). The R ratio precisely specifies the shape of the deviatoric stress tensor.

Reches and Dieterich (1983a,b), on the basis of a particular slip model, assumed that "the preferred faults, namely those which are not likely to slip, require the minimum stress difference and minimum dissipation". Considering only a few types of stress tensor (horizontal axially symmetric extension, horizontal axially symmetric compression, and vertical axially symmetric compression), these authors calculated the orientation of the preferred faults. Guiraud et al. (1989) defined the geometry of fractured domains reactivated under different deviatoric stress tensors, in the light of a theoretical approach to calculate the corresponding pitch onto the preexisting fault planes and to precisely determine the theoretical populations of fractures which are likely to be reactivated.

The first step of stress analysis is to check the angle between the fault plane and the striae of each data, because the measuring procedure in the field introduces errors due to the unevenness of the faults and inaccuracies in compass handling; these errors are of the order of few degrees and are reflected by a deviation of the striae from the fault plane.

The pressure/tension axes method (P/T method) calculates the theoretical compression (P) and tension (T) axes for each fault plane with lineation and known sense of movement (Turner, 1953). A constant angle between compression axis and shear plane is assumed. Based on experiments and on natural observations, Patterson, (1978); Jaeger and Cook, (1979) found that an angle of 30° is the most reliable to represent the mean angle between P-axis and fault plane. The orientation of the principal axes is determined from the maximum density of P- and T-axes, respectively (Sperner et al., 1993).

The terms P- and T-axes are used by seismologists in fault-plane-solution describing states of stress. Meschede (1994) used these terms for kinematic shortening and extension axes, bearing in mind that strain and stress axes coincide only in special cases. The basic assumption of the P-T method, namely a homogeneous rock mass, usually is not realized in nature because of preexisting anisotropies such as bedding and fractures. More realistic approaches towards stress analysis require: (a) incorporation of the cohesion and friction coefficients of the discontinuities into the fault-slip inversion (e.g., Reches, 1987; and Hardcastle, 1989). Different values lead to variations of the angle "θ". (b) consideration of the stress ratio, which influences not only the orientation of the principal stress axes, but also the slip direction (e.g. Bott, 1959). A meaningful application of the more sophisticated approaches depends on the quality of the field observations (program Turner, by Sperner et al., 1993). Requirement (b) is considered in the direct inversion method.

Meschede (1994) reported that a constant angle between compression axis and shear plane, as generally used in this method, is always a compromise which does not reflect the natural situation. Deviations occur particularly when faults are reactivated, since movement is easier along an existing fault plane even when it is at a low angle to the principal axes of stress, than the formation of a new fault. Following Meschede (op.cit.), the calculations of P- and T-axes of a data set were compared in this study, using a constant angle (15°, 30° and) 45° and using variable angles determined separately for each single fault (FIG. V.1). The best fit angles for the calculation with variable angles were determined from the homogeneous fault populations after performing the separation of the original data set. Meschede (1994) applied an enhanced P/T axes method, beginning with those faults whose P-(or T-) axes show the strongest deviation from the calculated orientation of the common axis, and each single fault was computed with different angles to determine the best fit angle reducing the deviation to a minimum. The enhancement of the deviation error of P- and T-axes using this method is demonstrated (FIG. V.2) where the reliable angle plot displays the highest density of axes distribution. This enhanced P/T axes method (Meschede, 1994), was applied only to some selected data sets of those described in this study. Each analysis is still very time-consuming and a computed program which performs this enhancement is not yet available (Meschede, 1994).

The maxima of P- and T-axes determined by the P/T method are not necessarily orthogonal, since they are calculated independently of their density distribution (Mardia, 1972). Using a least square minimization, Caputo and Caputo (1988) calculated orthogonal axes from the P- and T-axes. The computerized fault program written by Caputo and Caputo (1988), however, does not allow variation of the angle between the fault plane and the P-axis, which is pre-set for 45°. Another variation of the P/T axes method determines the best fitting angle between P- or T-axes of a data set, for all angles from 1° to 89°. The stress axes are derived from the maximum values which represent the orientation of $\sigma_1$ and $\sigma_3$, respectively (program Kinemat, written by Michel, 1993).

The numerical dynamic analysis of Spang (1972) calculates the bulk stress tensor by addition of all tensors which are determined for the faults of a data set, and division by the number of faults (program NDA, by Sperner et al., 1993). A distinct angle between compression axes and shear plane is assumed (the angle used here is) 30°. The right dihedra method determines compressional and extensional quadrants (pseudo-fault-plane solution; Almendinger et al., 1989) for each fault, similar to the fault-plane solutions used to describe earthquake focal mechanisms. Fields of maximum probability for the principal axes $\sigma_1$ and $\sigma_3$, respectively, are calculated by overlapping all pseudo fault-plane-solutions of a data set (Angelier and Mechler, 1977, cited in Mesched, 1994). Similar to the P/T method, orthogonal axes are calculated by a least-square minimization (Fault program written by Caputo and Caputo, 1988). The calculation of the principal axes by the direct inversion method requires symmetric data set. The program calculates the stress tensor by a least square minimization from the orientation of the fault planes and lineations without considering the sense of movement. Therefore, the compression axis will be placed into the center of the fault population where the acute angle of a conjugate fault system is located (Angelier and Goguel, 1979). If only one family of faults with lineations is represented in a data set, the calculation of stress tensors by the direct inversion method becomes meaningless, because the least square minimization leads to a conjugate system with a very small angle in between. For about half of the faults, the observed and calculated sense of movement coincide, whereas the other half will be separated as "negative value". Moreover, the stress ratio (R) calculated from asymmetric data sets shifts towards R=0 (FIG. V.2), and the result becomes worthless since the main stress component acting on almost all fault planes would be normal stress. This method is therefore very sensitive to fault populations with one strongly dominating family of faults, and is only applicable to symmetrical data sets.

The iterative grid search method of Hardcastle and Hills (1991) compares a fault-slip data set with a large number of tensors, and selects those tensors which fit all or portions of the data.

For each tensor position, the stress ratio is varied in increments, and is determined where the Mohr-Coulomb yield criteria have been satisfied for each fault. Parameters used are a cohesion of C=0, because preexisting faults are assumed, and a coefficient of friction of µ=0.4, which is close to natural values (e.g., Zoback et al., 1989). The tensor orientations are stored in a separate file when the conditions for selection (minimum percentage of faults fit by the tensor, and maximum angular divergence) are satisfied. The density pole of the best fitting tensors i.e., the tensors showing the maximum percentage of faults which fit the conditions, the minimum angular deviations, and the most reliable stress ratios is used to describe the stress axes of this fault data set. The iteration analysis of Oncken (1988) changes the variables (orientation of the principal axes, and stress ratio) of a tensor used to test the data set, until a minimum deviation of calculated maximum shear stress on a plane and observed lineation is reached. This method, however, does not consider the sense of movement along the shear plane, and is therefore very sensitive to asymmetric data sets.

Meschede (1994) compared the above programs and reported that the results were similar when a data set is symmetrical, and scatter strongly in the case of asymmetry. Taking into consideration the restrictions of calculation methods when used on asymmetric data sets, congruent results within a deviation error of ±10°-20° were obtained for compression and extension axes directions. Meschede explained also that deviations of the stress tensors from the general trend of a tensor group may be generated by reactivation of preexisting fault planes or joints, by later rotation (e.g., tilting of blocks) or by proximity to a large fault system which may be responsible for a deflection in the regional stress pattern.

Separation of homogeneous fault populations from inhomogeneous data sets was performed using field data criteria where available, supported mostly by graphical methods. It is suggested that the kinematic axes obtained from the separated data sets, represent the stress field which induced the formation of the faults.

The studied rocks in the area under consideration were generally submitted to successive tectonic phases corresponding to different tectonic stress tensors. Contradictory fault-slip data were found in about a third of the data-sets. Different directions with different pitch angles of striations on a fault plane indicate more than one deformation event, and reactivation of existing fault planes during a later deformation event. Consequently, considering this general case, the major problem is to sort out from the set of measurements, the slickensides generated by each successive tectonic phase, and to calculate the corresponding different stress tensors. In spite of their efficiency, the different computer-aided methods present some limits: the number of striations must be sufficient for a particular microtectonic station, the amplitudes of $\sigma_1$, $\sigma_2$, $\sigma_3$ cannot be calculated, and the geological significance of the results must be restricted by precise qualitative tectonic analysis. This requires separation of the inhomogeneous data sets into two or more homogeneous fault populations (Meschede, 1994; FIG. V.2). The data sets were separated into consistent fault populations, using graphical and mathematical methods. Based on overprinting relationships observed in the field, the fault populations were grouped into sequences which are considered to be cogenetic. Methods used to separate the data sets into consistent fault populations are the pole projection of fault slip data (Hoeppener, 1955), calculation of the theoretical compression (P) and tension (T) axes for each fault (Turner, 1953), the direct inversion method (Angelier and Goguel, 1979), and the iterative grid search method combined with an automatic separation (Hardcastle and Hills, 1991).

Due to its ability to separate and calculate successive deviatoric stress tensors, Etchecopar's method was processed using the graphic method of the optimal stresses (Etchecopar, 1984; and Mesched, 1994), which defines the distribution of the axes of the principal stresses. The principal σ1 of this method by construction is related to the optimal position of a neofracture with respect to the principal stresses. The plane bearing $\sigma_1$, $\sigma_3$ is assumed to be normal to the fault plane, and intersects the striation. $\sigma_1$ is at an angle of 30° to the striation, in accordance with the sense of displacement. The two other principal stresses are immediately inferred from the $\sigma_1$ location.

The pole-projection method of Hoeppener (1955) uses the poles of the fault planes in the lower hemisphere of the equal area net. The lineation is projected onto the poles with a short arrow indicating the sense of movement of the hanging wall block (FIG. V.4). Homogeneous groups of faults can be identified by the subparallel lineation arrows which point towards a common shortening axis (Mesched, 1994). A computer program (Split by Krejci and Richter, 1991) facilitates the separation of homogeneous subsets by the pole-projection method (Meschede, 1994).

Theoretical compression (P) and tension (T) axes calculated by the pressure/tension axes method (P/T-method), are plotted onto the lower hemisphere of the equal area net (using the program package of Sperner et al., 1993). To subdivide a data set into homogeneous fault populations, groupings of one of the axes (P or T) were separated.

The calculation of the data set by the direct inversion method indicates fault planes with "wrong" sense of movement comparing the calculated and the observed sense of movement (negative expected value, nev; see tables in Appendix 1). Separation of data is performed removing all contradictory data sets and those with high angular discordance (Meschede, 1994). This method is, however, restricted to symmetric data sets as mentioned above.

A separation by the iterative grid search method of Hardcastle and Hills (1991) is performed using the orientation and other parameters of one of the best fit tensors of a total search (of the entire data set) as a criterion for data selection. All data which fit this tensor are separated automatically into a subset. The remaining data set runs again the procedure of the iterative grid search method.

A separated subset is considered homogeneous and non-artificial if the number of faults which contradict the calculated stress tensor ("negative expected values" in program NDA by Sperner et al., 1993) is less than 20% (Meschede, 1994) of the data set, and the faults include reasonable angles with the principal stress axes to match the Mohr-Coulomb criterion of shear failure.

The fault-slip data from stations in the study area, were subdivided into five groups after separation of the inhomogenous fault populations and calculation of the stress tensors for each separated fault set and the collection of the better data sets. Each group of stress tensors is characterized by the mean orientation of the $\sigma_1$-axes of the tensors. There is no data set which shows remnants of all three tensor groups. Therefore, the time sequence was established by regional comparison and the field observations. The consistent directions of stress tensors over large distances is taken as an argument for the interpretation of the data in the way presented here.

However, one of the most critical points of fault-slip analysis is to determine the time of formation of the faults. Where the age data directly related to the age of formation e.g. radiometric age data of synkinematically crystallized minerals, was not always available, a relative time scale of fault populations was developed to correlate the kinematic results with other geological observations.

In homogeneous data sets, with more than one fault population, were found at about two thirds of the stations, and splitting of the inhomogeneous data sets resulted in a total of 96 homogeneous subsets, from which the deviatoric stress tensors were calculated. Separation of the data sets in stratigraphic order was useful to determine time relations between kinematic axes (Meschede, 1994).

SUMMARY OF INVENTION

The various embodiments detailed herein relate to a method, system and computer program product for borehole image interpretation analysis. More particularly, to the application of inversion algorithms to calculate principal stress orientations by using specific graphical components to visualize input data and results.

In accordance with one or more embodiments of this invention, a computer implemented method for conducting Borehole Image interpretation and predicting the image porosity, image permeability and using the outputs of the interpretation to address the; minimum and maximum horizontal stresses; strike and dip of the geologic features; rose diagrams showing the main directions and sets; stress analysis investigating the principal stress orientations; mohr coulomb of the fracture sets; defining a stress tensor analysis relating reservoir of interest using structural and Sedimentologic related to the subsurface reservoir of interest in an integrated computer environment having at least a graphical user interface and multiple analysis workflows; each module analysis workflow having user selectable tasks; applying at least one stress analysis workflow to the project and performing user selected tasks in the integrated computer environment, to carry out a porosity, permeability and stress analysis including determining the reservoir characteristics, geological trends and the likelihood of a pay zones and best perforation intervals; wherein the use of the stress analysis workflow is based upon the volume of data provided by the user through the performance of the selected tasks and the analysis project scoping data; and manage the performance of technical tasks required for the stress analysis project in order to determine the accumulation of hydrocarbons in the pay zones in the reservoir of interest.

The integrated computer environment comprises a user computer system, a network and a server; wherein the user computer system implements a web browser, and the user computer system displays web pages provided to the web browser by the server, and wherein the image porosity, image permeability and stress analysis project scoping data includes any one or more of defining project objectives, activities required to meet the project objectives, level of stress analysis, pay zone and perforation intervals required, experience level of the user, project start and end dates, development opportunity, subsurface data inventory and assessment of geological uncertainty, and prioritizing the project deliverables, and schedule in less than one hour for an interval exceeding 500 ft, even more.

The pay zone, perforation intervals and stress analysis project geological data includes any one or more of the reservoir and wherein the analysis project results include a graphical output, wherein the graphical output includes the interactive technical activity planner and a graphical representation of the uncertainty related to the data used to perform the analysis, further wherein each reservoir analysis project has access to, and is saved in, a searchable project library that can be used to link to data, including other active and inactive analysis projects.

The analysis workflows include any one or more of data analysis workflow, multi-well based analysis workflow, structural basin analysis workflow, reservoir analysis workflow, fracture analysis workflow, bedding planes, slippage passages and fracture corridors analysis workflow, and Geo-stresses and stress tensors analysis workflow and wherein the data analysis workflow includes user selectable tasks for any one or more of search for and locate data, determine data type and format, and prepare and load data.

The multi-well based analysis workflow includes user selectable tasks for evaluating the multi-well based context of the analysis including any one or more of stress, tensors and image porosity, image permeability, corridors, principal stresses and structural evolution, stratigraphic texture, carbonate stratigraphic fill, and identifying analogue stresses and associated tectonic regime.

Reservoir basin analysis workflow includes user selectable tasks for analyzing the reservoir and carrier bed systems including any one or more of identify and map key stratigraphic boundaries using available BHI, within key stratigraphic boundaries, assess reservoir quality, and validate the multi-well based analogue and wherein the structural analysis workflow includes user selectable tasks for evaluating the faults and fractures data including any one or more of identify and map multi-well based corridors candidates, evaluate continuity and character of intervals, estimate corridors quality and fracture potential, and estimate potential of critical faults and fractures along migration pathways.

Pay zones analysis workflow includes user selectable tasks for analyzing and mapping the pay ones and best perforation intervals data including any one or more of define favorable geologic settings for pay zones deposition, select best perforation intervals analogue, evaluate pay zones generation potential, and map rock spatial, temporal distribution and volume.

A computer implemented method for conducting a geologic stress analysis to determine the pay zones and best perforation intervals of hydrocarbons in a subsurface region of interest, the method comprising: data storage device having computer readable data including the project scoping data and the geological data related to the subsurface region of interest, and a plurality of analysis workflows; a graphical user interface; a display device; and a processor, configured and arranged to execute machine executable instructions stored in a processor accessible memory for performing a method comprising: defining a basin analysis project relating to at least one reservoir or multiple reservoirs within a subsurface region of interest using project scoping data and geological data related to the subsurface region of interest in an integrated computer environment having at least a graphical user interface and multiple basin analysis workflows; each analysis workflow having user selectable tasks; applying at least one analysis workflow to the analysis project and performing user selected tasks in the integrated computer environment, to carry out analysis including determining the above claims, geological trends and the likelihood of a hydrocarbon system; wherein the use of the analysis workflow is based upon the volume of data provided by the user through the performance of the selected tasks and the analysis project scoping data; and Integrating the results of the analysis, project scoping data, and the geological data in the integrated computer environment, to generate analysis project results. These including an interactive technical activity planner; wherein the project results are used to optimize and manage the performance of technical tasks required for the analysis project. In order to determine the pay zones, perforation intervals, stress analysis, fracture and slippage passages corridors of hydrocarbons in the subsurface region of interest.

Other objects and features will be in part apparent and in part pointed out hereinafter.

BRIEF DESCRIPTION OF THE DRAWINGS

The accompanying drawings and sketches are included to provide a further understanding of the invention, and are incorporated in and constitute a part of this specification. The drawings and sketches illustrate embodiments of the invention and, together with the description, serve to explain the principles of the invention.

In the drawings.

Corresponding reference characters indicate corresponding parts throughout the drawings.

DETAILED DESCRIPTION

Figure 1:
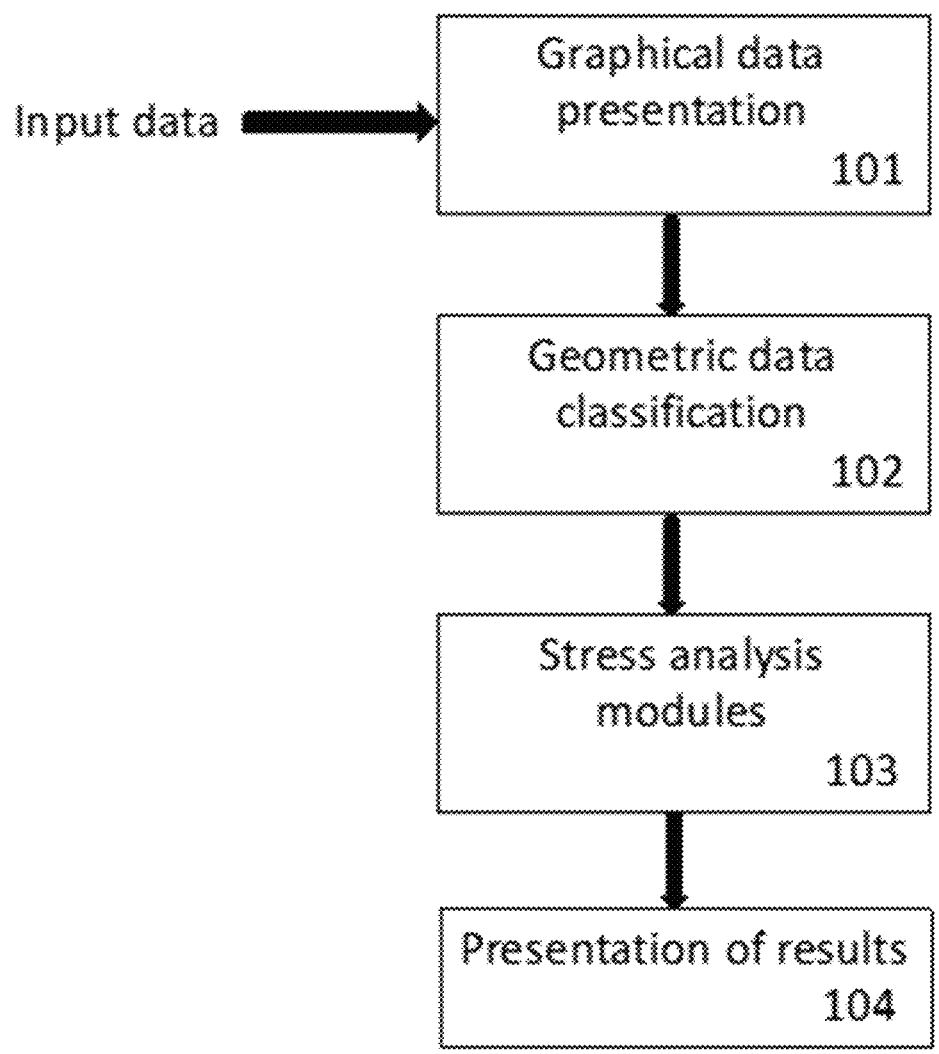
FIG. 1 illustrates one exemplary embodiment for a pipeline to perform stress analysis based on manual or automatic dip picking from borehole images in addition to striation orientation obtained from CT scan or cores analysis.

There are certain challenges in using borehole images for stress analysis. They are as follows:

Stress orientations are variable across the reservoirs and fields as a whole. However, the present software in the market do not address important parameters to define the significant stress orientations statistically.

Dip and azimuth of striations cannot be obtained directly from borehole images. In fact, these images provide maps of physical measurements of the rocks exposed on the borehole wall. However, the identification of striations' orientations requires multiple cross sections of the rock. In practice, cores and CT-scan images are used to overcome this challenge, if available and if not assumptions were made using different orientations on the fault and fracture planes.

Tectonic events, timing of the events, reactivation of the pre-existing weak planes are all representing challenges in dealing with stress orientations. Therefore, identification and separating these tectonic events in successive periods is very complicated process.

Stress-Analysis: Theoretical Background

The theory behind the new tool to evaluate fracture and fault stability around the borehole is to:

Compute Normal Stress and Shear Stress on the fracture plane; and

Apply Mohr-Coulomb Criterion

In principal stress coordinate, there are 3 principal stresses, $\sigma_1$, $\sigma_2$, and $\sigma_3$, for any plane (or fracture). Then the normal stress on the plane is s which can be calculated, meanwhile, shear stress on the plane, can also be calculated.

The present methods of fracture analysis fall into two groups: kinematic and dynamic. In addition, in each general class, one can analyze the data by either numeric or graphical methods, and field relations contain the ultimate clues to, and the ultimate justification for, application of these methods (it is recommended to apply this methodology on the outcrops to calibrate our model). The analysis of fracture data aims to determine the orientation of the three principal stress axes, which caused fracturing ($\sigma_1$, $\sigma_2$, and $\sigma_3$). Since Carey and Brunier (1974), numerous interactive linear and nonlinear algorithms to solve such problems have been described (Angelier, 1989; Angelier et al., 1982; Angelier, 1989; Michael, 1984; Etchecopar and Mattauer, 1988; Armijo and Cisternas, 1978; Armijo et al., 1982; and many others). All nonlinear procedures have been proposed under two important assumptions (Huang, 1989): 1—all striae directions coincide with maximum shear stress on fault planes; 2—fault planes are distributed randomly over the spherical space and are independent with respect to the orientation of the stress axes (Bott's hypothesis, 1959). For the linear model, a constraint is added to ensure that the magnitude of the shear stress on fault planes with different orientations is constant or unitary (Michael, 1984). On these assumptions, Carey and Brunier (1974) first proposed a procedure to compute stress axes and stress ratio (R). Since then, a number of similar procedures have been advanced and applied to fault tectonic analysis (e.g. Letouzy, 1986; and Bergerat, 1987). Since, the fractures are the first stage in the faulting process and the displacement is very small, we can consider the displacement of the fracture is depending on its mode and the accompanying faulting.

According to the two-dimensional Mohr-Coulomb theory (Jaeger and Cook, 1979), fault slip occurs when shear stress t across a fault plane equals the frictional resistance to slip:

$$\tau = \tau_0 + \mu(\sigma_n - P) \qquad \text{Equation 2}$$

Where $\tau_0$ is the cohesive shear strength of the fault, $\mu$ is the friction coefficient, $\sigma_n$ the normal stress across the fault, and P is the fluid pressure of water in the fault zone and its surroundings. In unfaulted material, the two conjugate planes on which failure and slippage occur at the lowest differential stress ($\sigma_1-\sigma_3$) are perpendicular to the plane containing the greatest and least principal stresses ($\sigma_1$ and $\sigma_3$ respectively); they intersect in the intermediate principal stress ($\sigma_2$), and are inclined at angles of $\pm\theta_0$ to $\sigma_1$, where;

$$\theta_0 = 45° - 1/2 \tan - 1\ \mu \qquad \text{Equation 3}$$

Laboratory-derived values of internal rock friction yield $\mu=0.6-0.9$ (Byerlee, 1978), and imply that $\theta_0=25°-30°$.

Seismological determinations of earthquake slip directions (fault-plane solutions) resolve two possible orthogonal fault planes, but in the absence of supplementary data, the actual plane of slippage cannot be distinguished (Thatcher and Hill, 1991). In studies in which fault-plane solutions are used to infer principal stress orientations, it is usually assumed that the $\sigma_1$ direction bisects the angle between the two orthogonal fault planes, even though it is recognized that seismic data can determine only the principal axes of the seismic moment tensor (Aki and Richards, 1980). This is equivalent to assuming that slippage occurs on planes of maximum shear stress, and for usual values of rock friction, these planes differ by 15° to 20° in orientation from the optimum Mohr-Coulomb failure planes.

In the absence of fault planes of optimum orientation $\theta_0$, slippage can occur at higher stresses or higher ambient fluid pressures on less optimally preexisting planes of weakness (Thatcher and Hill, 1991). Provided that such planes can be reactivated lower than those required to create new fractures of optimum orientations, reactivation in a stage of compressive stress ($\sigma_3$-P_0) can occur on fractures/faults inclined by as much as $2\theta_0$ from the $\sigma_1$ direction (Sibson, 1985).

Structural and paleomagnetic evidence indicates that in many regions faults rotate away from the orientation of $\sigma_1$ as they slip (Freund, 1974; and Proffet, 1977), suggesting that faults beginning at $\pm\theta_0$ would rotate to progressively less optimal orientations as they evolve (Thatcher and Hill, 1991).

It is usually assumed that in the brittle crust, one principal stress is vertical and the remaining two are horizontal, the vertical stress being given by the rock overburden pressure. For strike-slip faulting, the greatest and least principal stresses are horizontal and the intermediate stress is vertical.

A number of inversion methods utilize slickensided surfaces to more fully describe stress. The slickenlines are assumed to represent the direction of maximum resolved shear stress on the fault plane. The stress field, under which these slickenlines developed, is assumed to be uniform. No assumptions are made regarding the relationship between the fault plane and stress orientation, a requirement in regions where faults have occurred on preexisting surfaces. Such fault-slip inversion methods yield the stress tensor orientation and the relative magnitudes of the stress axes (tensor configuration, Hardcastle, 1989). However, the absolute magnitudes of the stress axes are not determined (Angelier, 1984, and 1989; Armijo et al., 1982; Etchecopar et al., 1981; Gephart and Forsyth, 1984; and Reches, 1987).

During inversion where calculations are based on resolved stress, it is important to determine if Mohr-Coulomb yield criteria have been satisfied, as these criteria can greatly affect the resolved normal ($\sigma_n$) and shear stresses ($\tau$) (Reches, 1987; and Ivins et al., 1987). Yield criteria include coefficient of friction $\mu$ and cohesion C on the fault/fracture surface. Fluid pressure $P_{fluid}$ is implied in $\sigma_n$, where $\sigma_n=\sigma_n-P_{fluid}$. A value for $P_{fluid}$ is not considered computationally in any of the inversion methods. These criteria are related by the Mohr-Coulomb equation $\tau^3$ C+$\mu\sigma_n$ (Eq.4). As faults are reactivated discontinuities, C and $\mu$ pertain to the properties of the discontinuities, and not to the intact rock strength. There is increasing evidence and controversy over the value of "$\mu$" for natural fault zones (e.g., the San Andreas Fault zone in California, Zoback, 1987). The values can apparently be very low relative to values typically derived in laboratory experiments (Byerlee, 1986).

Methods used to separate the data sets into consistent fracture populations are the pole projection of fracture data, calculation of the theoretical compression (P) and tension (T) axes for each fault (Turner, 1953), the direct inversion method (Angelier and Goguel, 1979), and the iterative grid search method combined with an automatic separation (Hardcastle and Hills, 1991).

Due to its ability to separate and calculate successive deviatoric stress tensors, Etchecopar's method was processed using the graphic method of the optimal stresses (Etchecopar, 1984), which defines the distribution of the axes of the principal stresses. The principal $\sigma_1$ of this method by construction is related to the optimal position of a neofracture with respect to the principal stresses. The plane bearing $\sigma 1$, $\sigma_3$ is assumed to be normal to the fracture plane. The two other principal stresses are immediately inferred from the 01 location.

The pole-projection method of Hoeppener (1955) uses the poles of the fault planes in the lower hemisphere of the equal area net. The lineation is projected onto the poles with a short arrow indicating the sense of movement of the hanging wall block. Homogeneous groups of faults can be identified by the subparallel lineation arrows, which point towards a common shortening axis (Meschede, 1994). A computer program (Split by Krejci and Richter, 1991) facilitates the separation of homogeneous subsets by the pole-projection method.

Theoretical compression (P) and tension (T) axes calculated by the pressure/tension axes method (P/T-method) are plotted onto the lower hemisphere of the equal area net (using the program package of Sperner et al., 1993). To subdivide a data set into homogeneous fracture populations, groupings of one of the axes (P or T) were separated.

Coulomb Excess Stress

The Shear Stress exceeding the Mohr-Coulomb envelope; The higher CES, the worse $$CES = \tau - (c + \sigma\tan\phi) \qquad \text{Equation 4}$$

Coulomb Excess Stress (CES) is used to reflect the risk (or tendency) of a fracture or a fault to slide along the plane. t is the shear stress on the plane, and c is the cohesion of the fracture plane. The first limitation of SLB and GMI models is by assuming c is equal to zero and this is the reason, why the fractures on their models did not show any critically stressed sets. s is the normal stress and f is the friction angle. In our model, we calculated the cohesion getting the unconfined compressive strength from the Geomechanics model, but still needs to be calibrated by applying triaxial and Brazilian tests on the cores.

CES is determined from the distance from the stress states away from the Mohr-Coulomb envelope.

The calculation of the principal stress axes not differ significantly using different numerical or graphical methods.

The methods used were the P/T axes method, right-dihedra method, iterative grid search method, numerical dynamic analysis, direct inversion method. In some cases, the principal axes $\sigma_1$ and $\sigma_2$ or $\sigma_2$ and $\sigma_3$ are exchanged, specifically when numerical methods (direct inversion and iterative minimization) are used.

The invention covers GeoStress and GeoStrain modules according this table:

| Category | Module |
|---|---|
| Check of data | Inspect |
| Graphical data presentation (Stereoplot) | Lineaments |
|  | Planes |
| Graphical data classification (Rose diagrams) | Rose Plot |
|  | Direct |
| Rotation of lineations | Twist |
| Stress Analysis (sigma1-3, R, Mohr) | TensorTwin |
|  | TensorRos |
|  | TensorKin |
|  | TensorInv |
|  | TensorFoc |
|  | TesnorMech |
| Presentation of results (sigma1-3, Mohr, Fluctuation hist) | TesnorPal |
|  | TesnorTau |
|  | TensorConv |
| Separation of datasets | TesnorSig |
|  | TesnorPlane |
|  | TesnorRegi |

The following describes the software workflow to perform stress analysis. The workflow is applicable to any feature visible in a borehole image. This feature can be picked manually or automatically: (1) sedimentary related heterogeneities including bedding planes, stylolites, burrows and vugs, (2) fracture related heterogeneities including faults, continuous fractures and discontinuous fracture, and (3) drilling related fractures including drilling induced, breakout and washout.

FIG. 1 illustrates one exemplary embodiment for a pipeline to perform stress analysis based on manual or automatic dip picking from borehole images in addition to striation orientation obtained from CT scan or cores analysis. The software pipeline includes a graphical data presentation module 101, a geometric classification module 102, a stress analysis module 103 and results visualization module 104.

FIG. 1 or portions of it can be implemented as software on a processor, with the whole system or part of it combined with other needed circuitry in a single physical device or in many physical devices. It can be implemented for real-time, near real time or offline software. The software can be used to analyze a full wellbore or a portion of it.

The system is designed to take as an input the following data:

| True dip | True Azimuth | True dip of striae | True azimuth of striae | Sense of slip | Confidence level |
|---|---|---|---|---|---|

True dip and true azimuth of the geological features are obtained from any borehole interpretation module that can be manual or automatic. True dip and true azimuth of striae are typically obtained from CT scan images or cores. In the case of absence of these later data, the software modules assume that true dip of striae is equal to the one of the related geological feature. The modules allow the user to perform sensitivity analysis of azimuth of striae φ_s based on the true azimuth of the related geological feature φ_f as follows:

$$\varphi\_s = \varphi\_f \pm 90°$$

The sense of slip is characterized by + for reverse and— for normal relative slip of the hanging wall. The software module Inspect is used to check striae data for orthogonality and corrects small deviations. First, the module calculates the angle $\alpha$ between the feature's plane and striae. Then, $\alpha$ is compared to a threshold $\alpha\_0$ given by the user. Data with $\alpha > \alpha\_0$ are considered as outliers. The user is required to correct them.

Figure 2:
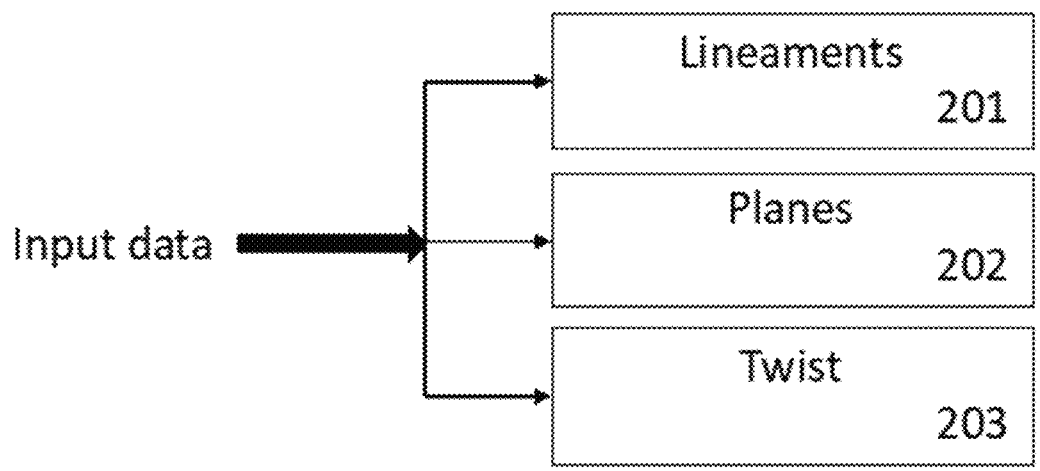
FIG. 2 illustrates one exemplary embodiment for a pipeline to perform graphical data presentation.

FIG. 2 illustrates one exemplary embodiment for a pipeline to perform graphical data presentation. The module 201 Lineaments takes as input bearing and plunge of the lineations (or dip, azimuth) and plots lineations in an equal area, lower hemisphere Stereonet. Optionally, the average vector is calculated and plotted into the same diagram.
Lineaments Plot L-Plot The module 202 Planes takes as an input the features striae data. Then, data are presented in an equal area, lower hemisphere Stereonet. Features such as faults, bedding planes, fracture etc. are plotted as great circles; striae are marked at the great circles by arrows pointing in the direction of relative slip of the hanging wall. The head style of the striae arrows expresses the degree of confidence in slip-sense determination. Optionally, the orientations of the principal stresses are added.
Planes Plot P-Plot The module twist 203 allows the rotation of planes, lineations and plane-lineation-glide sense data. It takes as input:

Planes data: dip azimuth and dip inclination
Lineations data: bearing and plunge
Plane-lineation-glide sense data The output of this module is a graphical component that rotates planes, lineations and plane-lineation-glide sense data around any rotation axis. Rotation sense is positive for counterclockwise rotation looking towards the origin of the coordinate system.

Figure 3:
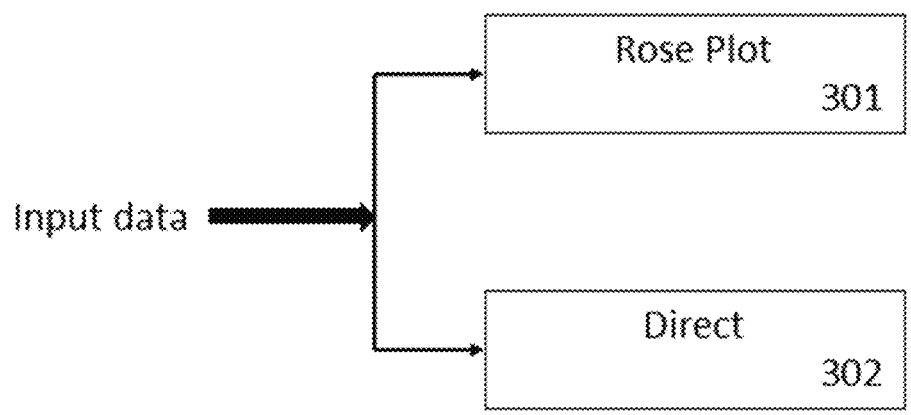
FIG. 3 illustrates one exemplary embodiment for a pipeline to perform geometrical data classification.

FIG. 3 illustrates one exemplary embodiment for a pipeline to perform geometrical data classification. The module Rose Plot 301 takes as input true azimuth (or the strike) and the true dip. Then, three kinds of representations with different angle ranges are available. The module Direct 302 is used to plot rose diagrams of striae data. The module illustrates dip azimuth and dip inclination of features like faults and fractures in addition to bearing and plunge of striae, and rake (angle between the downward direct striae and the strike of the related features containing it) on rose diagram. A geometrical classification is particularly useful for large populations and the comparison of mesoscale data with map-scale faults. The classification allows a quick recognition of the dominant fault type.

Figure 4:
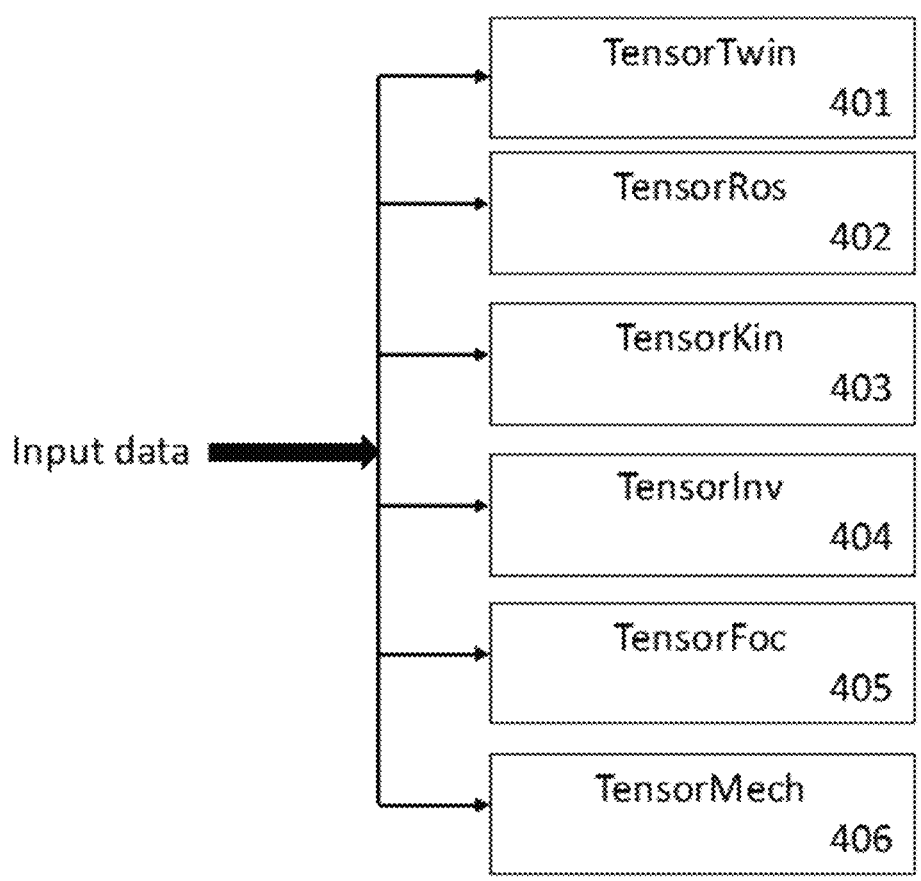
FIG. 4 illustrates one exemplary embodiment for a pipeline to perform stress analysis. This pipeline consists of six modules.

FIG. 4 illustrates one exemplary embodiment for a pipeline to perform stress analysis. This pipeline consists of six modules:

TensorTwin (module 401) (Turner, 1953): The purpose of this module is to determine stress axes from plane-lineation-glide sense data using the P-B-T axes method. The program first calculates compression and extension axes, which lie in the plane containing the glide plane normal and the glide direction. Any angle θ between the compression axis and the glide plane can be selected (except 0° and multiples of) 90°. The P-T axes are plotted in an equal area, lower hemisphere Stereonet. Optionally, the mean vector of the P-T axes is calculated and plotted into the same diagram. Since the vector means are calculated independently from each other, they might not be orthogonal. The B axis is determined perpendicular to the vector mean of the P and T axes.

Figure 5:
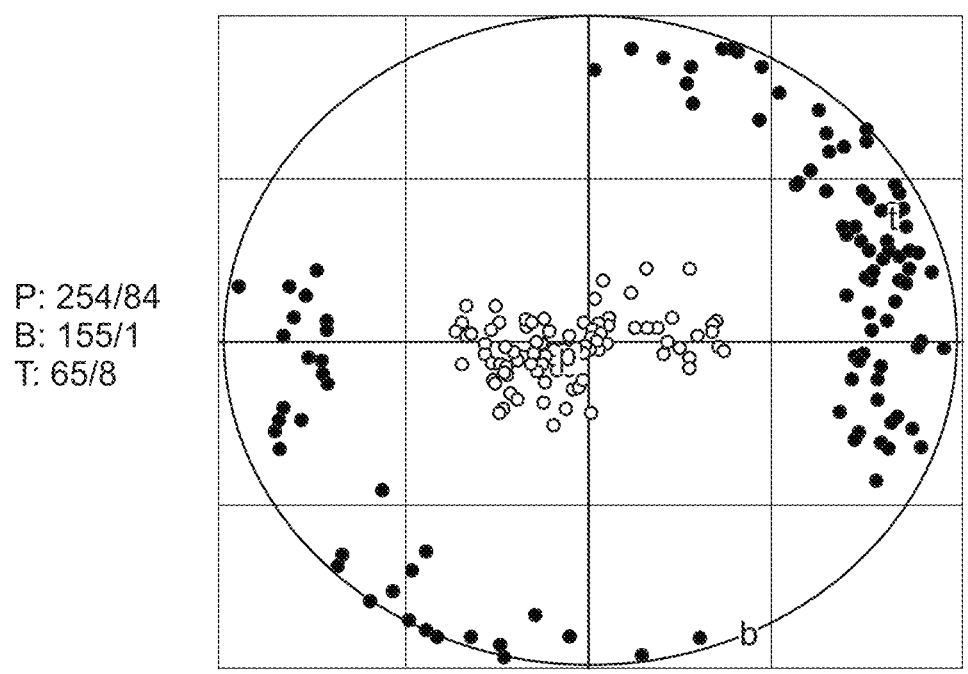
FIG. 5 illustrates an example of a TensorTwin output.

FIG. 5 illustrates an example of a TensorTwin output.

TensorRos (module 402) (Lisle, 1987): The purpose of this module is to determine stress axes from planes-striae data. The orientation of the minimum and maximum principal stresses ($\sigma\_1$, $\sigma\_3$) is fixed by three constraints:

The stress axes are orthogonal to each other;

The stress axes lie in the dihedra which are given by the feature plane and by the auxiliary plane perpendicular to the striae;

The stress axes lie in the diagonal opposite halves of the P-T dihedra, which are separated, be a second auxiliary plane containing the features planes normal and the striae.

The module calculates the likelihood that a given direction (X) is identical with $\sigma\_1$. First P1 is calculated as the percentage of features for which X lie the $\sigma\_1$ dihedra. Then directions (Z) perpendicular to X are checked as candidates for $\sigma\_3$. For each orientation of Z, two likelihoods are determined:

P2: percentage of features with Z in the $\sigma\_3$ dihedra;

P3: percentage of features which fulfill the above constraints,

Z ($\sigma\_3$) is the direction which maximizes the product P2*P3. Finally, the total likelihood P1*P2*P3 is calculated.

TensorKin (module 403) (SPANG, 1972): The purpose of this module is to determine stress axes from plane-lineation-glide sense data using numerical dynamic analysis. The module calculates the principal stress directions ($\sigma\_1$, $\sigma\_2$, $\sigma\_3$) and the stress ratio $R=(\sigma\_2-\sigma\_3)/(\sigma\_1-\sigma\_3)$ from plane-lineation-glide sense data. For each dataset, the best fitting compression response extension axis is determined. The axes lie in the plane, which contains the glide plane normal and the glide direction. Axes orientations are transformed into second order tensors. Addition of all tensors and division by the number of data sets yields the bulk stress tensor. Any angle θ between the compression axis and the glide plane can be selected (except 0° and multiples of) 90°.

The angle between the calculated direction of maximum shear stress and the observed glide direction is determined for each glide plane. These angles are plotted in a fluctuation histogram. The arithmetic mean of these angles is called fluctuation. Data are also shown in a normalized Mohr circle diagram.

TensorKin, NDA

TensorInv (module 404) (Angelier, 1979): The purpose of this module is to determine stress axes from plane-lineation-glide sense using a direction inversion algorithm. The module calculates the principal stress directions ($\sigma\_1$, $\sigma\_2$, $\sigma\_3$) and the stress ratio $R=(\sigma\_2-\sigma\_3)/(\sigma\_1-\sigma\_3)$ from plane-lineation-glide sense data using a least-square minimization on the angles between the calculated and the observed glide direction.

The angle between the calculated direction of maximum shear stress and the observed glide direction is determined for each glide plane. These angles are plotted in a fluctuation histogram. The arithmetic mean of these angles is called fluctuation. Data are also shown in a normalized Mohr circle diagram.

TensorFoc (module 405) (W. Gephart, 1990): The purpose of this module is to determine stress axes from plane-lineation-glide sense data using numerical dynamic analysis. The module calculates the principal stress directions ($\sigma\_1$, $\sigma\_2$, $\sigma\_3$) and the stress ratio $R=(\sigma\_2-\sigma\_3)/(\sigma\_1-\sigma\_3)$ from plane-lineation-glide sense data. Shear stress on a plane depends on four of the nine numbers of the stress tensor and the sense of one additional number: the three principal stress directions, expressed by three Euler angles ($\Theta$, $\Psi$, $\Phi$), and the stress magnitude, expressed by R, which indicates the magnitude of the intermediate principal stress relative to the two extreme ones. An optimum stress model is the one, which most closely predicts the observed feature plane geometry. Two general issues are addressed by any inverse problem:

On what basis is, the optimum model selected (what specific measure of misfit is used, such that it is minimized relative to all the data by the best model).

How is the optimum model identified among all the possible candidates?

In order to locate the best model, a grid search over the four model parameters ($\sigma\_(1\text{-}3)$, R), adjusting each systematically one at a time, is applied. For each stress model constructed in this sequence, each fault datum is examined and the deviation in orientation between observation and prediction is determined. Summing the misfits of all the data, a measure of overall fitness is achieved. The model with the smallest sum of misfits is the optimum model.

Specific solution of the inverse problem:

ad (1): Because in fault-striae studies orientations matter, the orientation difference between given orientations and any ones which are consistent with the model are minimized; the orientation differences are expressed as rotations. In order to effect the rotations of a fault geometry relative to a particular stress tensor, two coordinate systems are defined to determine the transformation matrix ($\beta\_{ij}$); one is attached to the stress tensor, the other to the fault geometry. One condition for agreement between observation and model requires that there is no shear stress in B (parallel to the fault plane and normal to the slip direction). The expression:

$$R = (-\beta\_13 \; \beta\_23)/(\beta\_12 \; \beta\_22)$$

characterizes all admissible combinations of relative stress magnitudes (R) and relative orientations ($\beta\_{ij}$ transformation matrix) in order for the shear stress and the slip direction to be aligned.

The following measure of misfit between an observed fault geometry and a stess model can be adopted: ((a)-(c) have one axis of the fault geometry coordinates in common with the observed fault geometry. They also ensure agreement in the sense of slip and determine a rotation angle, which is a function of R and $\beta\_{ij}$).

(a) a common fault pole, but a different slip vector and B axis;

(b) a common slip vector, but different fault pole and B axis;

(c) a common B axis, but different fault pole and slip vector.

The Pole Rotation Method adopts the rotation $\Theta$ (or some functions of it) around the fault (or any feature) pole as the measure of misfit between an observed feature geometry and a stress model (Done in most of the stress studies. The misfit angle is generally summed up to allow an easy comparison between models).

The Approximate Method takes the smallest of the rotations determined according (a)-(c) as the misfit between observations and model.

The Exact Method identifies the smallest of all possible rotations about a general axis. The difficulty is that a priori the axis of the minimum rotation in unknown. An initial estimate of the smallest rotation axis is made by making rotations around seven axes including rotations around the axes of (a) to (c) above. The least of the seven rotations misfit so calculated is taken as an initial estimate. Then, rotations about two nearby axes along orthogonal trajectories from the original axis are calculated, which locate the local slope of the solution surface. A new axis is selected in the downslope direction, and the procedure is repeated. In this way, the search proceeds down the slope of the steepest descent. After a number of iterations, if no small rotations are located, the step-size is decreased in order to prevent overstepping of the minimum value. When the step size reaches a prescribed minimum value, the search is terminated. For each stress model tested, the rotation magnitudes are summed over all data, thus achieving a single measure of consistency between each model and the entire data set. The model with the smallest sum of misfits is the best fitting model.

TensorMech (module 406): This module uses a grid search algorithm, which tests a great number of tensors against a data collection. For each orientation of $\sigma\_(1-3)$, and for each R, the magnitude and direction of the maximum resolved shear stress and the normal stress on each fault plane are calculated. Each fault striae set is tested whether: (1) the angular divergence $\Theta$ between the calculated and the observed glide direction is within the user specific limit and (2) the yield strength of the fault plane is achieved or exceeded. If more than a user specified percentage of features in the data collection satisfies both previous points, the tensor configuration is stored. Then, the next R, $\sigma\_2$, $\sigma\_3$ and finally the next $\sigma\_1$ position is tested. A homogeneous collection of features-stria data yields large number of tensors, which are similar, and compatible with nearly all data, a heterogeneous collection is compatible only with portions of data.

Figure 6:
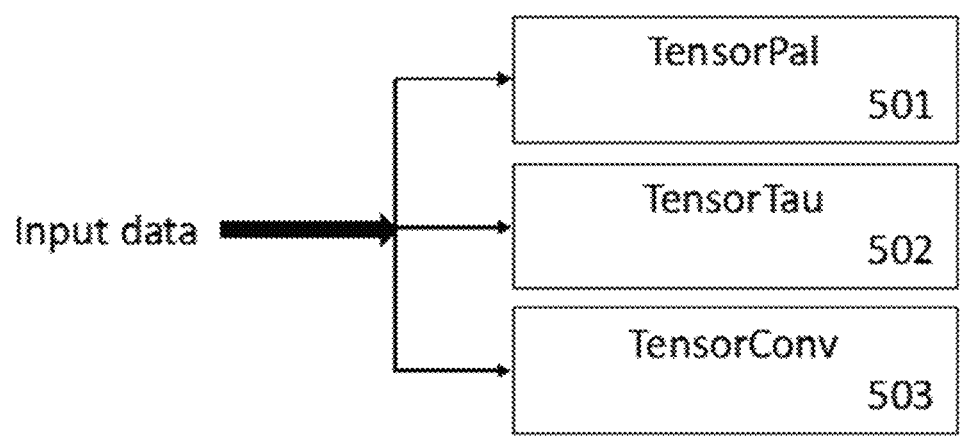
FIG. 6 illustrates one exemplary embodiment for a pipeline for results visualization.

FIG. 6 illustrates one exemplary embodiment for a pipeline for results visualization. The purpose of module 501 TensorPal is to plot a beach ball (hypothetical nodal planes) for given stress axis orientations. It takes as input the orientation of the minimum and maximum principal stresses $\sigma\_1$ and $\sigma\_3$ given as bearing and plunge. The actuate angle between the two given axes is calculated and for values smaller than 88 a warning is given. The hypothetical nodal planes with poles bisecting the two axes are plotted in an equal are, lower hemisphere Stereonet. The compressive quadrants are colored.

Optionally, the stress axis orientations are plotted in the same stereogram. The orientation of the third axis $\sigma\_2$, which is also calculated by the program, is indicated together with the two others.

The purpose of module 502 TensorTau is to plot fluctuation histogram and normalized Mohr circle diagram. It takes as input the orientation of principal stress components $\sigma\_1$, $\sigma\_2$ and $\sigma\_3$, and the stress ratio R. The angle between the calculated direction of maximum shear stress and the observed glide direction is determined for each glide plane. These angles are plotted in a fluctuation histogram. The arithmetic mean of these angles is called fluctuation. Data are also shown in a normalized Mohr circle diagram.

The purpose of module 503 TensorConv is to plot features-striae data, normalized Mohr circle diagram and fluctuation histogram. It takes as input the orientation of principal stress components $\sigma\_1$, $\sigma\_2$ and $\sigma\_3$, and the stress ratio R. The of maximum shear stress is determined for each glide plane. The data sets are separated into features, which are compatible with the reduced stress tensor, and features, which are incompatible. The compatible and incompatible features are plotted as great circles in different Wulff projections (lower hemisphere). On the great circles, both the calculated directions of maximum shear stress and the measured striae are indicated. The angle between these two directions is called $\alpha$. A fluctuation histogram of angles $\alpha$ and a normalized Mohr circle diagram are also represented for the compatible faults.

For datasets with unknown or poorly known stress ratio R, the program optionally calculates all directions of maximum shear stress. They are plotted in a Wulff projection together with the measured striae. This allows the estimation of the best compatible values of R for individual planes and given directions $\sigma\_(1-3)$.

In a modified version of the Mohr circle diagram, only the $\sigma\_1$ $\sigma\_3$ circle is shown. The shear stress of all the planes are shown as curves of R values for 0 to 1 with 0.1 increments. Each of these curves starts and ends at the Mohr circle and gives a useful indication of the evolution of $\tau/\sigma\_n$ ratios with varying R.

Figure 7:
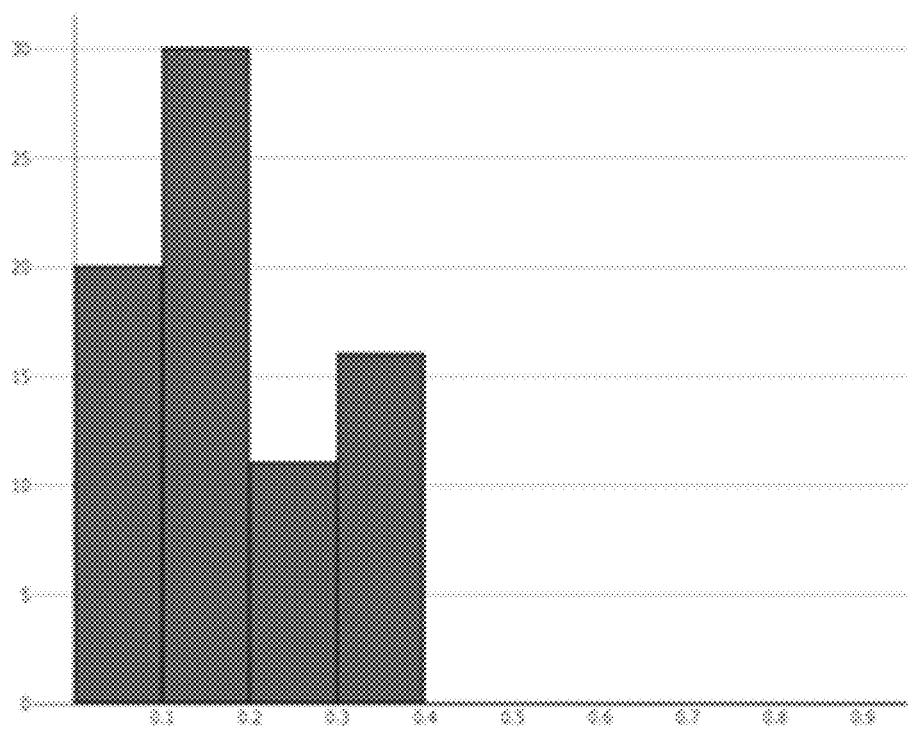
FIG. 7 illustrates an example of a fluctuation histogram.
Figure 8:
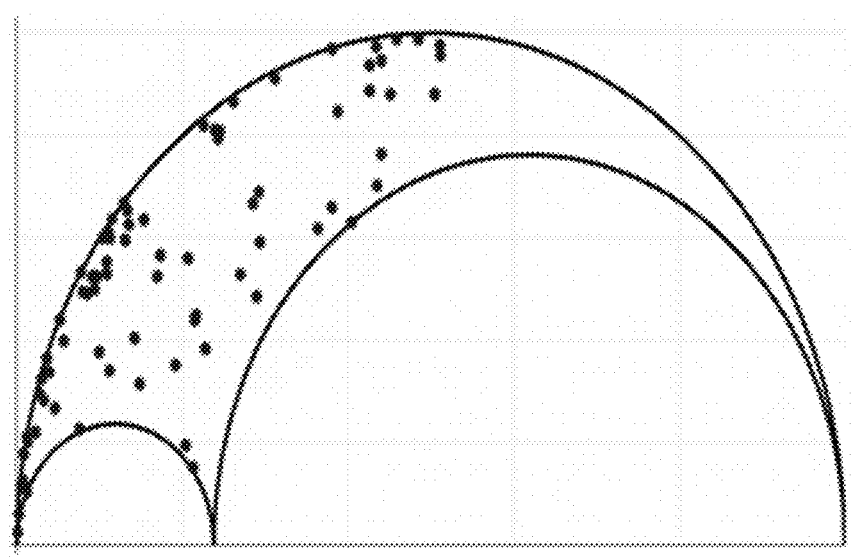
FIG. 8 illustrates an example of a Mohr circle.

FIGS. 7 and 8 present, respectively, examples of fluctuation histogram and Mohr circle generated by this tool.

Figure 9:
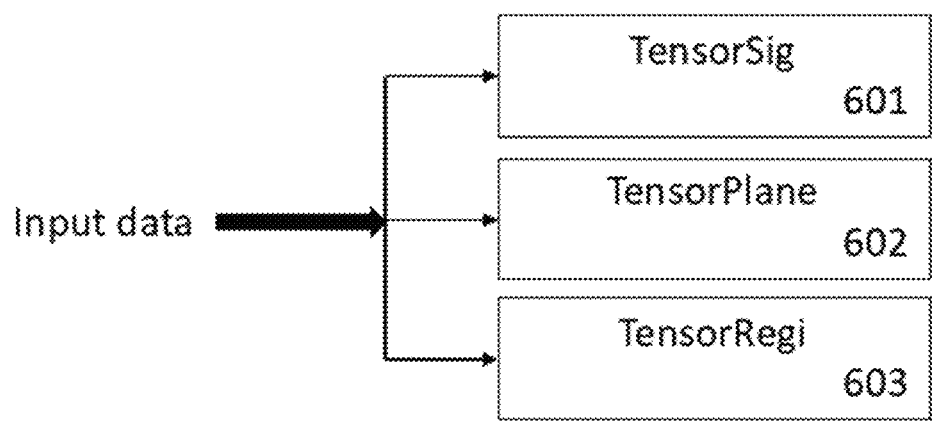
FIG. 9 illustrates one exemplary embodiment for a pipeline for separation of datasets.
Figure 10:
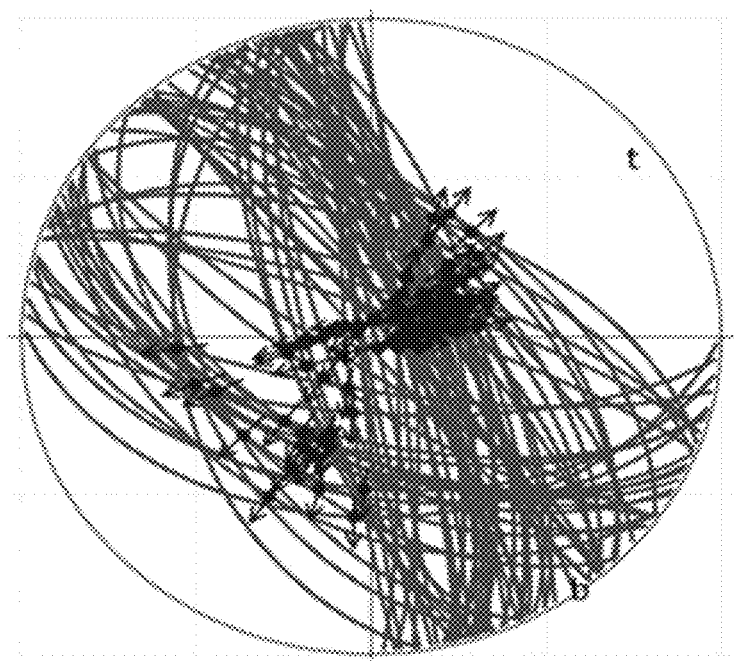
FIG. 10 illustrates one example of a TensorSig output.

FIG. 9 illustrates one exemplary embodiment for a pipeline for separation of datasets. The module TensorSig 601 is used for stereoplot of features-striae data and stress axes orientations. Data are presented in an equal area, lower hemisphere Stereonet. Features are plotted as great circles; striae are marked at the great circles by arrows pointing in the direction of relative slip of the hanging wall. The head style of the striae arrows expresses the degree of confidence in slip-sense determination. Optionally, the orientation of the principal stress axes is added. FIG. 10 presents an example of TensorSig output.

Figure 11:
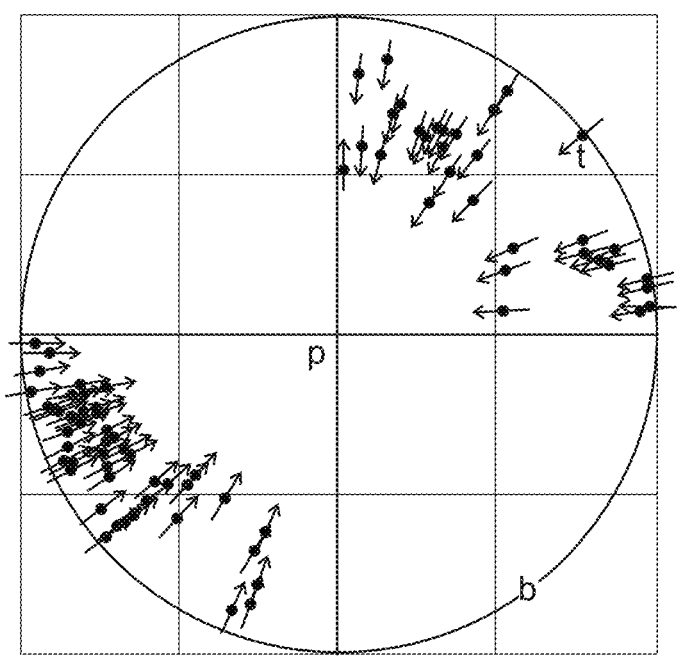
FIG. 11 illustrates one example of a TensorPlane output.

The module TensorPlane 602 is used for stereoplot of features-striae data and stress axes orientations (Hoeppener, 1955). Data are presented in an equal are, lower hemisphere Stereonet. Features are plotted as poles; striae are marked at the great circles by arrows pointing in the direction of relative slip of the hanging wall. The head style of the striae arrows expresses the degree of confidence in slip-sense determination. FIG. 11 presents an example of TensorPlane output.

The module TensorRegi 603 is used for dynamic cluster analysis to separate a heterogeneous set of orientation data that is characterized by:

Visualize heterogeneous orientation data in a stereographic projection to be separated into subsets;
Count a number of subsets, which can be defined by visual inspection;
Estimate the mean orientation of each subset;
Assign each orientation to the subset closest to it by using the smallest angle (largest cosine) between the mean orientation and the particular orientation;
After inspection of the cluster, try another orientation with better nuclei.

Figure 12:
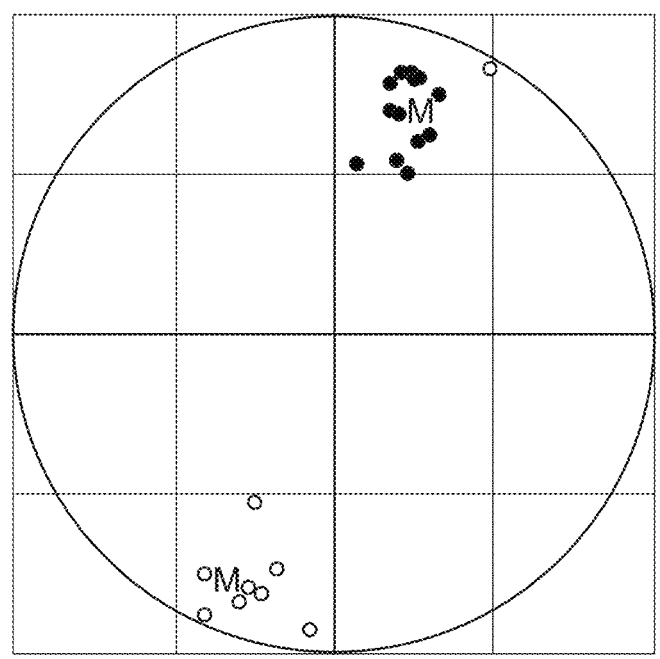
FIG. 12 illustrates one example of a TensorRegi output.

FIG. 12 presents an example of TensorRegi output.

Technical Description of the Modules

A. Graphical Data Representation Using Stereoplots:

For problems of structural geology, it is important that the orientations of planes and lines are correctly identified. However, this is a cumbersome process to be done in the standard x-y-z coordinates, and an easy solution is to use stereographic projections.

Stereographic projections involve drawing planes and lines in a manner that they would appear if they intersected the bottom of a transparent sphere when viewed from above. Not that the choice of using the bottom of the sphere is just a convention, for example mineralogists use the top of the sphere. On a 2D plane, this sphere is represented with a two-dimensional projection referred as stereographic projection or stereonet.

Lineaments (L-plot): This plot functionality is primarily designed for the visualization of lines, as we have in the x-y-z coordinates.

Planes (P-plot): This functionality plots the poles of planes in the lower hemisphere of the stereonet.

B. Graphical Data Classification (Rose Diagrams):

These diagrams are used to visualize the circular distribution of directional data. These are primarily used in geological field work to analyze data containing magnitude and directional values. In structural geology, Rose diagrams are used to plot the orientation of joints and dykes. Implemented in Rose plot, the diagram plots lines at each of the 360 degrees of a compass distribution, with the length proportional to the number of values in that direction. For smaller datasets, the directions are accordingly binned.

C. Stress Analysis:

This module contains the different functionalities to analysis stress. We provide briefly overview of each of the algorithms implemented in the toolbox.

1. TensorTwin (see paragraphs describing TensorTwin above).

2. TensorRos: Similar to various other approaches, Lisle (1987) proposed to estimate the orientation of the various components of the stress tensor and also the stress ratio from measured orientation information contained in fault planes-stria data and their associated directions of maximum shear stress. It is well known that data from a single fault plane leads to an ill-posed problem, as is later discussed in TensorInv, and an adequate determination of the unknowns is not straightforward. Several constraints have been proposed to restrict the possible solutions for the stress tensor. Lisle (1987) showed that the information contained in fault plane-stria data can be used to place tighter constraints on the stress tensor, thereby improving over the right dihedra configuration used in Anglier (1979) and earlier works. With this additional constraint, the computation of the stress tensor becomes more accurate as well as efficient.

Figure 13:
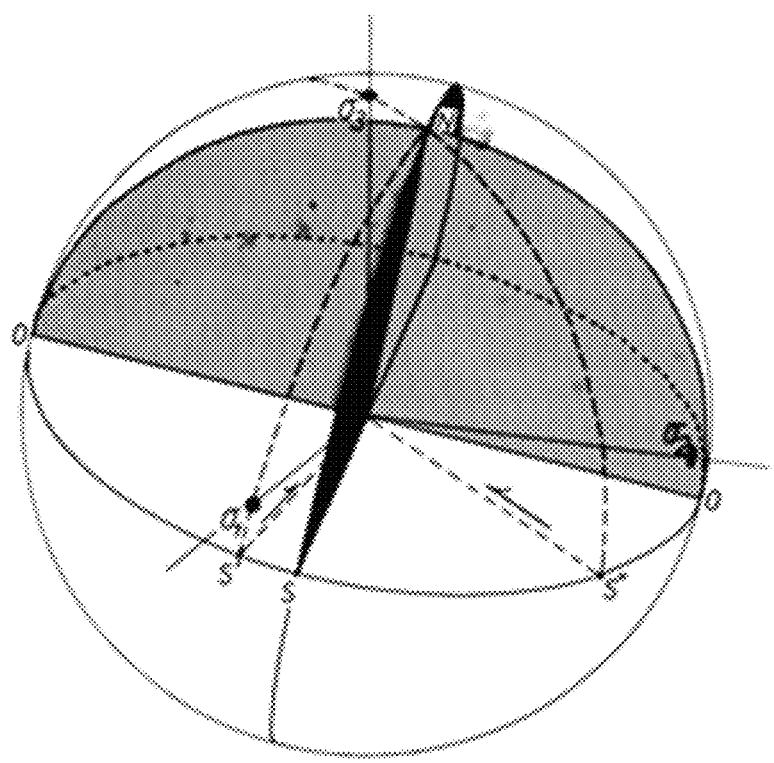
FIG. 13 is a schematic representation showing that maximum and minimum principal stress directions in separate pairs of bounded dihedral

An understanding of the additional constraint can be obtained from FIG. 13. Consider a fault plane F whose normal N has direction cosines l, m and n and coincident with $\sigma_1$, $\sigma_2$ and $\sigma_3$ respectively. Extending over the constraints described in Jaeger (1962), when the stress is compressional and directed axially $\sigma_1 > \sigma_2 = \sigma_3$, R=0, the first direction cosine l=0, hence SN will be oriented along 01. Here, R is the stress ratio. When stress is axial extension, ($\sigma_1 = \sigma_2 > \sigma_3$; R is infinite), the third directional cosine n becomes 0, thus the plane SN becomes parallel to $\sigma_3$. These are the extra directions that S can choose. For other possible choices of stress ratio, S will be within the acute angle range bounded by the projections of $\sigma_1$ and $\sigma_3$ on the fault plane. Based on this observation, Lisle (1987) have inferred that for a 3D case, the two principal stresses should be contained within separate dihedra. This observation can be used for example to constrain the search region for $\sigma_3$, if an assumption is made for $\sigma_1$, thereby allowing a tighter solution space for the determination of the stress tensor.

3. TensorKin: This approach involves the computation of the orientations of the principal stresses through dynamic analysis using a numerical method (Spang, 1972). With this, it overcomes the issue of extensive time consumption observed with previous methods, especially associated with plotting and contouring the compression and extension axis diagrams. Dynamic analysis assumes that all twin sets (compression and extension axis pairs) represent the same amount of strain. Since the shear direction is fixed, it is possible to represent the strains by a two-dimensional Mohr circle of infinitesimal strain. The strain in each twin in such case is of the form of a second order tensor.

Figure 14:
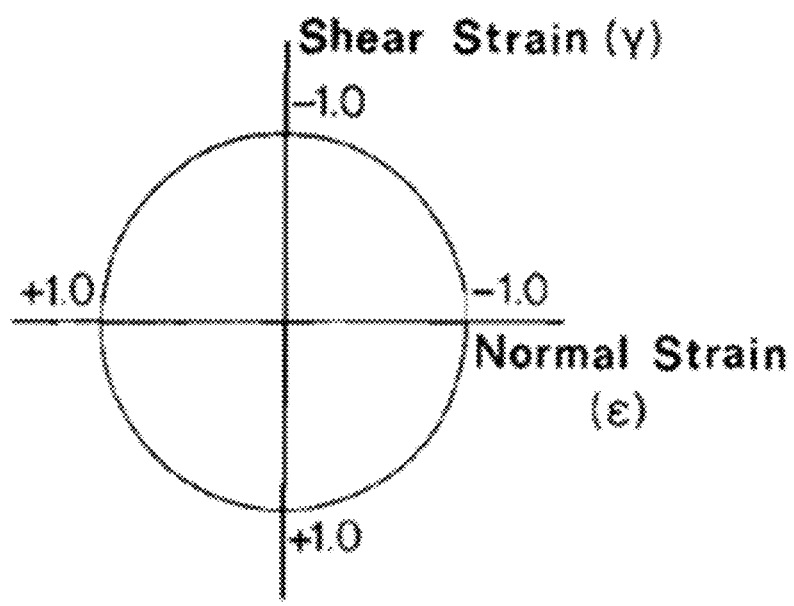
FIG. 14 illustrates a Mohr circle of infinitesimal strain where compression and extension are represented as positive and negative, respectively.

This can be understood better from FIG. 14, where for each twin set, shear strain is assigned an arbitrary value of 1.0. Since the direction of shear stress is fixed, the strains are represented by the two-dimensional Mohr circle. For detailed interpretation of the strains from the Mohr circle diagram, see Spang (1972). The principal strains are aligned exactly with the compression and extension axes of dynamic analysis.

To project data from different sources and compare different sets of compression and rotation diagrams, all the data is rotated into the same place of reference. For this rotation, the following second order transformation formula is used.

$$E_{ij} = E_{\alpha\beta} l_{\alpha i} l_{\beta j}$$

where, $l_{\alpha i}$ and $l_{\beta j}$ are the direction cosines. Based on this rotation, the stresses are of the following form:

$$E_{ij} = \begin{matrix} p^2 - p'^2 & pq - p'q' & pr - p'r' \\ pq - p'q' & q^2 - q'^2 & qr - q'r' \\ pr - p'r' & qr - q'r' & r^2 - r'^2 \end{matrix}$$

where p, q and r are the direction cosines of the angles between the compression axis and the three principal axes, respectively, and p', q' and r' refer to the direction cosines of the angle between the extension axis and the three principal axes. This system matrix is a second order tensor. The stress tensors for every twin set are added together and divided by the number of twin sets to obtain the bulk tensor.

4. TensorInv: Based on the work presented in Anglier (1979), this approach involves determination of stress axes through direct inversion of the field measurements of plane-lineation glide-sense data. Primarily designed to study the fault mechanisms associated with the tectonic events, this approach assumes that each population of faults, joints, or dykes that define the measurements, correspond to a single tectonic event and correspond to a single regional tensor. Further, it requires that multiple successive events are differentiated a priori in the field based on stratigraphic and structural observations. The orientation of the shear stress is computed from the orientation of the principal stresses $\sigma_1$, $\sigma_2$ and $\sigma_3$ and the ratio R which is computed as $$R = \frac{\sigma_2 - \sigma_3}{\sigma_1 - \sigma_3}$$

(as $\sigma_1 \geq \sigma_2 \geq \sigma_3$ with $\sigma_1 \neq \sigma_3$ and $0 \leq R \leq 1$).

Let T denote the stress tensor, where the stress components defined earlier are acting on the fault plane F. This approach uses a direct iterative method to estimate the stress tensor T. The direct inversion is based on a least square maximization of the shear stress-a component of tangential stress which would induce shear with respect to real slickenslides. The system equations involved in this optimization are (Anglier, 1979):

$$Ad + De + Ef + G\cos\psi + J\sin\psi = 0$$
$$Dd + Be + Ff + H\cos\psi + K\sin\psi = 0$$
$$Ed + Fe + Cf + I\cos\psi + L\sin\psi = 0$$

$$M\cos2\psi + \frac{1}{2}N\sin2\psi + (Jd + Ke + Lf)\cos\psi - (Gd + He + If)\sin\psi = 0$$

The 14 parameters A to N are simple homogeneous polynoms of the components for the normal and tangential directions of stress.

5. TensorFoc: Most inversion techniques related to inversion of earthquake focal mechanism data suffer from uncertainty as to which nodal plane is the true fault plane. It is required that the preferred nodal plane is chosen by the user, and the entire inversion is based on that choice. This a priori choice is generally done based on the knowledge of the local geology and tectonics. However, there does not exist a clear and concrete approach to make the above choice. Gephart and Forsyth (1984) presented an objective approach for the selection of the preferred plane from the focal mechanism data.

Figure 15:
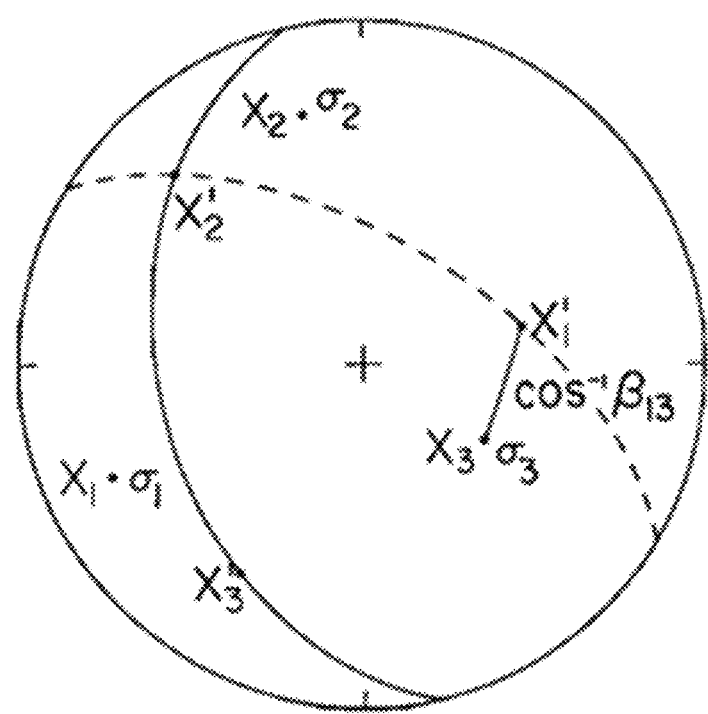
FIG. 15 illustrates an unprimed set for principal stress directions and a primed set for denoting an observed fault geometry.

This module is based on the work of Gephart and Forsyth (1984) and the goal is to determine the principal stress directions and the stress ratio from a number of focal mechanisms. For a better understanding, consider the two sets of cartesian coordinates shown in FIG. 15: unprimed set for principal stress directions and a primed set for denoting the observed fault geometry. Authors further denote the assumption that slip of the plane is in the direction of resolved stress on the plane in the direction normal to the slip, expressed as $$\beta_{11}\beta_{21} + \beta_{12}\beta_{22} + \beta_{13}\beta_{23} = 0$$

where $\beta_{ij}$ denotes the angle cosine between the primed and unprimed coordinates. Relating with the principal stresses, the stress ratio can then be stated (see Gephart and Forsyth (1984) for details):

$$R = \frac{\sigma_2 - \sigma_1}{\sigma_3 - \sigma_1} = -\frac{\beta_{13}\beta_{23}}{\beta_{12}\beta_{22}}$$

If a given fault geometry that related to a certain hypothetical stress direction gives R<0 or R>1, then the corresponding solution of principal stress is not valid. For compatibility the predicted sense of slip is determined from the dot product of the traction and slip vectors is determined. If the product is negative, the two vectors are in opposite directions and the solution is not consistent.

This procedure is reversed to formulate an inversion problem such that slip directions are predicted iteratively at every step from the principal stress directions, and compared with the observed slip direction as a test of the validity of the stress model. This way of posing as an inversion problem allows to search for a stress model that is compatible with all the slip directions such that the difference between the observations and the predictions is minimized.

For the inversion problem, Gephart and Forsyth (1984) define the misfit function for a given fault plane geometry w.r.t a specific stress model based on the angular difference between the observed plane and slip direction. In general, the best choice of misfit as per the authors is the minimum rotation about any axis that brings the fault plane geometry into coincidence with a geometry that satisfies the equation of stress ratio defined above.

For searching the best solution, grid search is performed over all models as well as the confidence limits. For each model tested in the grid search, summation is performed over one-norm misfits from all the observations to express the misfit for the model. For full details on the model optimization as well as computing solutions within provided confidence intervals, see the paper of Gephart and Forsyth (1984).

6. TensorMech: Based on the work of Hardcastle and Hills (1991), this module iteratively conducts mathematical testing on thousands of tensor configurations against a collection of fault-slip data. For the inversion part, it relies on the approach of Gephard and Forsyth (1984). The following three conditions are tested for each configuration:

Predicted slip direction is approximately parallel to the actual slip direction on the fault planes.

Whether the yield strength of the discontinuity is achieved or exceeded.

Whether the fraction of observations that satisfy (1) and (2) is greater than a certain threshold or not.

Presentation of Results

1. TensorPal: This module uses beachball diagram to represent the determined stress orientations. We discuss here briefly the concept of the beach ball model. A beach ball is a representation chosen to represent the slip associated with faulting: strike-slip, normal, thrust (reverse), or some combination. In addition, it also shows the direction of slipping as well. The 2-dimensional focal mechanism circle is really the projection of the fault orientation and slip on the lower half of a sphere surrounding the hypocenter, the location of the earthquake in the crust.

Figure 16:
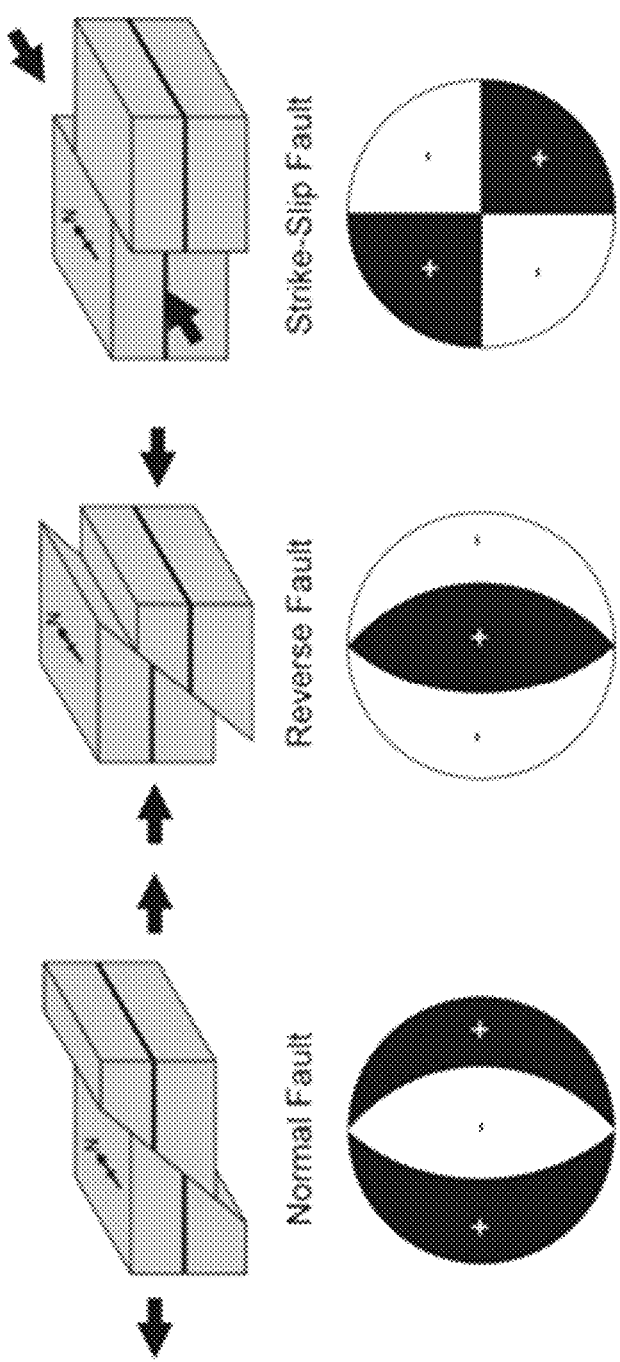
FIG. 16 is a schematic representation of three fault-types and corresponding beachball diagrams.
Figure 17:
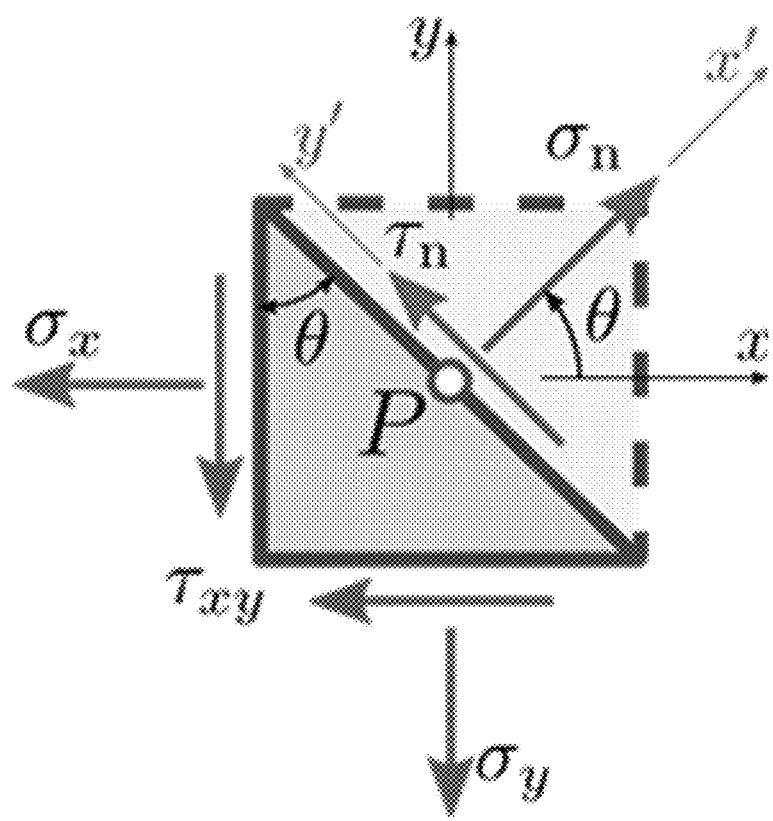
FIG. 17 illustrates stress components at a plane passing through a point P.

In FIG. 16, we show the three fault-types and the respective beachball diagrams. We first discuss the strike-slip fault case where a fault that is purely characterized by strike-slip is shown. In the beachball representation, the darker-shaded quadrants of the focal mechanism denote motion towards those quadrants and the ligher shaded quadrants indicate motion away from those quadrants. For the normal and reverse faults, it is relatively harder to define since the fault is not vertical, rather it dips at an angle beneath the surface.

2. TensorTau: This functionality plots fluctuation histogram and Mohr circle diagram for the representation of focal mechanisms. As stated earlier, 'fluctuation' denotes the mean of the angles between the calculated direction of maximum shear stress and the observed glide direction. This data is represented using the Mohr circle diagram.

Mohr circle is primarily a two-dimensional graphical technique to represent the transformation law for the Cauchy stress tensor. It is used to calculate the different components of the stress tensor through representing them on planes with horizontal and principal components. These are called the principal planes in which the principal stresses are calculated.

In two dimensions, the stress tensor at a given point P with respect to any two perpendicular directions is completely defined by only three stress components: normal stresses $\sigma_x$ and $\sigma_y$ and the shear stress $\tau_{xy}$. The Cauchy stress tensor is then written as $$\sigma = \begin{bmatrix} \sigma_x & \tau_{xy} & 0 \\ \tau_{xy} & \sigma_y & 0 \\ 0 & 0 & 0 \end{bmatrix} \equiv \begin{bmatrix} \sigma_x & \tau_{xy} \\ \tau_{xy} & \sigma_y \end{bmatrix}$$

With the Mohr circle, it is possible to represent the stress components on a differently oriented plane passing through P and perpendicular to the x-y plane.

The equation for the Mohr circle is derived using the two-dimensional cases of plane-stress and plane strain, a two-dimensional infinitesimal material element around a material point P with a unit area in the direction parallel to the y-z plane is considered. From equilibrium of forces on the infinitesimal element, the magnitudes of the normal stress and shear stress are given as:

$$\sigma_n = \frac{1}{2}(\sigma_x + \sigma_y) + \frac{1}{2}(\sigma_x - \sigma_y)\cos 2\theta + \tau_{xy}\sin 2\theta$$

$$\tau_n = -\frac{1}{2}(\sigma_x - \sigma_y)\sin 2\theta + \tau_{xy}\cos 2\theta$$

3. TensorConv: This functionality also uses fluctuation diagram and is based on the Mohr circle diagram.

Embodiments of the present disclosure may comprise a special purpose computer including a variety of computer hardware, as described in greater detail below.

For purposes of illustration, programs and other executable program components may be shown as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A system comprising:
a computer image processor configured to receive at least one image of a borehole and input data relating to geological features thereof; and a memory storing processor-executable modules that, when executed by the processor, perform a stress analysis of the borehole, the processor-executable modules comprising:
a graphical data presentation module configured to generate a graphical user interface visualizing the input data;
a classification module configured to plot a rose diagram of striae from the input data for classifying the geological features of the borehole based on fault type;
a stress analysis module configured to assess principal axes orientations and stress ratios, the stress analysis module including inversion algorithms to calculate principal stress orientations; and
a results visualization module configured to generate a graphical user interface visualizing results of the stress analysis in specific graphical components, wherein the graphical data presentation module comprises at least one of:
a lineaments module configured to plot lineations from the input data;
a planes module configured to plot striae from the input data; and
a twist module configured to rotate the plotted lineations and/or striae.

2. The system as set forth in claim 1, wherein the stress analysis module comprises a plurality of tensor modules configured to perform one or more of the following from the input data:
determining stress axes from plane-lineation-glide sense data using a P-B-T axes method;
determining stress axes from planes-striae data;
determining stress axes from plane-lineation-glide sense using a direction inversion algorithm;
determining stress axes from plane-lineation-glide sense data using numerical dynamic analysis; and
testing tensors using a grid search algorithm.

3. The system as set forth in claim 1, wherein the input data relating to geological features of the borehole comprises one or more of true dip, true azimuth, true dip of striae, true azimuth of striae, sense of slip, and confidence level.

4. The system as set forth in claim 1, wherein the processor-executable modules further comprise a borehole interpretation module configured to obtain true dip and true azimuth of the geological features of the borehole.

5. A computer-implemented method for conducting a borehole stress analysis from an image thereof, the method comprising:
receiving at least one image of a borehole and input data relating to geological features thereof;
generating, by a graphical data presentation module executed on an image processor, a graphical user interface visualizing the input data;
plotting, by a classification module executing on the image processor, a rose diagram of striae from the input data to classify the geological features of the borehole based on fault type;
assessing, by a stress analysis module executing on the image processor, principal axes orientations and stress ratios, the stress analysis module including inversion algorithms to calculate principal stress orientations; and
generating, by a results visualization module executing on the image processor, a graphical user interface visualizing results of the stress analysis in specific graphical components.

6. The method as set forth in claim 5, wherein generating the graphical user interface visualizing the input data comprises at least one of:
plotting, by a lineaments module executing on the image processor, lineations from the input data;
plotting, by a planes module executing on the image processor, striae from the input data; and
rotating, by a twist module executing on the image processor, the plotted lineations and/or striae.

7. The method as set forth in claim 5, wherein assessing principal axes orientations and stress ratios comprises performing one or more of the following from the input data:
determining stress axes from plane-lineation-glide sense data using a P-B-T axes method;
determining stress axes from planes-striae data;
determining stress axes from plane-lineation-glide sense using a direction inversion algorithm;
determining stress axes from plane-lineation-glide sense data using numerical dynamic analysis; and
testing tensors using a grid search algorithm.

8. The method as set forth in claim 5, wherein the input data relating to geological features of the borehole comprises one or more of true dip, true azimuth, true dip of striae, true azimuth of striae, sense of slip, and confidence level.

9. The method as set forth in claim 5, further comprising obtaining, by a borehole interpretation module executing on the image processor, true dip and true azimuth of the geological features of the borehole.

10. The method as set forth in claim 5, further comprising:
defining, using the input data, a basin analysis project relating to one or more reservoirs within a subsurface region of interest;
executing at least one of a plurality of multiple basin analysis workflows, the at least one analysis workflow having one or more user selectable tasks;
applying the at least one analysis workflow to the basin analysis project and performing the user selectable tasks; and
integrating results of the at least one analysis workflow and the input data to generate analysis project results for display via the graphical user interface.

11. The method as set forth in claim 10, wherein the user selectable tasks include an interactive technical activity planner.

12. The method as set forth in claim 10, wherein the analysis project results optimize and manage performance of technical tasks required for the analysis project.

13. The method as set forth in claim 10, wherein performing the user selectable tasks of the at least one analysis workflow include one or more of the following:
determining pay zones in the subsurface region of interest;
determining optimal perforation intervals of hydrocarbons in the subsurface region of interest;
identifying geological trends in the subsurface region of interest;
determining a likelihood of a hydrocarbon system in the subsurface region of interest;
performing a stress analysis; and
identifying fracture and slippage passages corridors of hydrocarbons in the subsurface region of interest.

14. A system for conducting a geologic stress analysis of a subsurface region of interest, the system comprising:
a data storage device storing computer-readable data, the computer-readable data relating to the subsurface region of interest and including at least one of project scoping data and geological data;
a processor-accessible memory storing machine-executable instructions;
a processor configured to execute the instructions stored in the memory; and
a display device coupled to the processor and configured to display a graphical user interface;
wherein the instructions, when executed by the processor, configure the processor for:
retrieving the computer-readable data relating to the subsurface region of interest from the data storage device
defining, using the retrieved computer-readable data, a basin analysis project relating to one or more reservoirs within the subsurface region of interest;
executing at least one of a plurality of multiple basin analysis workflows, the at least one analysis workflow having one or more user selectable tasks;
applying the at least one analysis workflow to the basin analysis project and performing the user selectable tasks; and
integrating results of the at least one analysis workflow and the retrieved computer-readable data to generate analysis project results for display via the graphical user interface.

15. The system as set forth in claim 14, wherein the user selectable tasks include an interactive technical activity planner.

16. The system as set forth in claim 14, wherein the analysis project results optimize and manage performance of technical tasks required for the analysis project.

17. The system as set forth in claim 14, wherein the computer-readable data further includes the plurality of multiple basin analysis workflows.

18. The system as set forth in claim 14, wherein the user selectable tasks of the at least one analysis workflow include one or more of the following:
determining pay zones in the subsurface region of interest;
determining optimal perforation intervals of hydrocarbons in the subsurface region of interest;
identifying geological trends in the subsurface region of interest;
determining a likelihood of a hydrocarbon system in the subsurface region of interest;
performing a stress analysis; and
identifying fracture and slippage passages corridors of hydrocarbons in the subsurface region of interest.

19. The system as set forth in claim 14, wherein the instructions, when executed by the processor, further configure the processor for executing inversion algorithms to calculate principal stress orientations by using specific graphical components to visualize input data and results.

\* \* \* \* \*